US012608172B2

(12) United States Patent
Fu et al.

(10) Patent No.: US 12,608,172 B2
(45) Date of Patent: Apr. 21, 2026

(54) MATRIX COMPUTING METHOD, CHIP, AND RELATED DEVICE

(71) Applicant: HUAWEI TECHNOLOGIES CO., LTD., Shenzhen (CN)

(72) Inventors: Guangning Fu, Shenzhen (CN); Tengyi Lin, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 71 days.

(21) Appl. No.: 18/748,393

(22) Filed: Jun. 20, 2024

(65) Prior Publication Data

US 2024/0338174 A1      Oct. 10, 2024

Related U.S. Application Data

(63) Continuation      of      application      No. PCT/CN2022/137086, filed on Dec. 7, 2022.

(30) Foreign Application Priority Data

Dec. 20, 2021      (CN) .......................... 202111567014.8
Apr. 28, 2022      (CN) .......................... 202210460849.1

(51) Int. Cl.
*G06F 5/16*      (2006.01)
*G06F 9/38*      (2018.01)
*G06F 17/16*      (2006.01)
(52) U.S. Cl.
CPC .............. *G06F 5/16* (2013.01); *G06F 9/3836* (2013.01); *G06F 17/16* (2013.01)

(58) Field of Classification Search
CPC .......... G06F 5/16; G06F 9/3836; G06F 17/16; G06F 7/5443; G06F 3/0656; G06F 3/06; G06F 7/523; G06F 8/36; Y02D 10/00
See application file for complete search history.

(56) References Cited

U.S. PATENT DOCUMENTS 6,161,173 A * 12/2000 Krishna .............. G06F 9/30038
712/214
6,772,310 B2 * 8/2004 Thompson ............ G06F 3/0613
714/6.24

(Continued)

OTHER PUBLICATIONS

International Search Report and Written Opinion in International Appln. No. PCT/CN2022/137086, mailed on Feb. 7, 2023, 12 pages (with English translation).

(Continued)

*Primary Examiner* — Farley Abad
(74) *Attorney, Agent, or Firm* — Fish & Richardson P.C.

(57) ABSTRACT

This application provides a matrix computing method, a chip, and a related device. The chip includes a first buffer, is configured to buffer a first vector, and a second buffer is configured to buffer a second vector. A scheduling module generates a selection signal based on a bitmap of the first vector. The selection signal may cause the processing element to obtain, from the first buffer, a group of non-zero elements in the first vector, and cause the processing element to obtain, from the second buffer, a group of elements in the second vector. An operation is performed between the first vector and the second vector based on the group of non-zero elements in the first vector and the group of elements in the second vector. In this application, an element whose value is 0 in one vector may be excluded from computing, to reduce a computing amount.

20 Claims, 8 Drawing Sheets

(56) References Cited

U.S. PATENT DOCUMENTS

| | | | |
|---|---|---|---|
| 2013/0073599 A1 | 3/2013 | Maloney | |
| 2020/0228137 A1* | 7/2020 | Chinya | H03M 7/3066 |
| 2021/0097130 A1 | 4/2021 | Liu et al. | |
| 2021/0319317 A1* | 10/2021 | Power | G06N 3/063 |

OTHER PUBLICATIONS

Extended European Search Report in European Appln. No. 22909746. 4, mailed on Feb. 18, 2025, 7 pages.

\* cited by examiner

Multi-path multiplexer

Multiplexer

Strobe signal

Buffer

Data unit

Multi-path multiplexer

Buffer

1st row

2nd row

3rd row

4th row

1st column   2nd column   3rd column   4th column   5th column   6th column   7th column   8th column ○ Priority of a data unit connected
to a 1ˢᵗ multi-path multiplexer ▨ Priority of a data unit connected
to a 4ᵗʰ multi-path multiplexer

| 1 | 1 | 1 | 0 | 1 | 0 | 0 | 1 |
| 1 | 0 | 0 | 1 | 0 | 1 | 1 | 0 |
| 1 | 0 | 1 | 0 | 1 | 0 | 1 | 1 |
| 0 | 1 | 0 | 1 | 0 | 1 | 0 | 0 |

↑ Bitmap

| 2 | 1 | 4 | 0 | 3 | 0 | 0 | 7 |
| 5 | 0 | 0 | 2 | 0 | 8 | 3 | 0 |
| 2 | 0 | 8 | 0 | 9 | 0 | 5 | 1 |
| 0 | 2 | 0 | 4 | 0 | 5 | 0 | 0 |

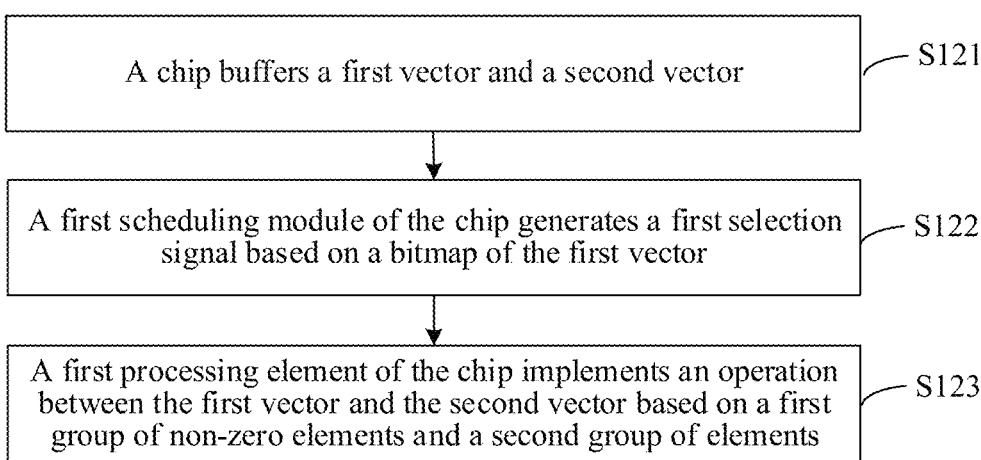

A chip buffers a first vector and a second vector ⟶ S121

A first scheduling module of the chip generates a first selection signal based on a bitmap of the first vector ⟶ S122

A first processing element of the chip implements an operation between the first vector and the second vector based on a first group of non-zero elements and a second group of elements ⟶ S123

FIG. 12

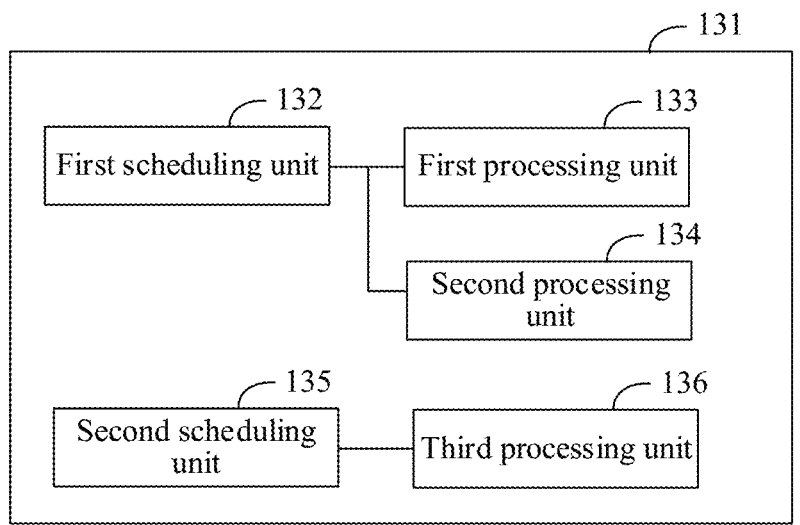

131

132 First scheduling unit

133 First processing unit

134 Second processing unit

135 Second scheduling unit

136 Third processing unit

FIG. 13

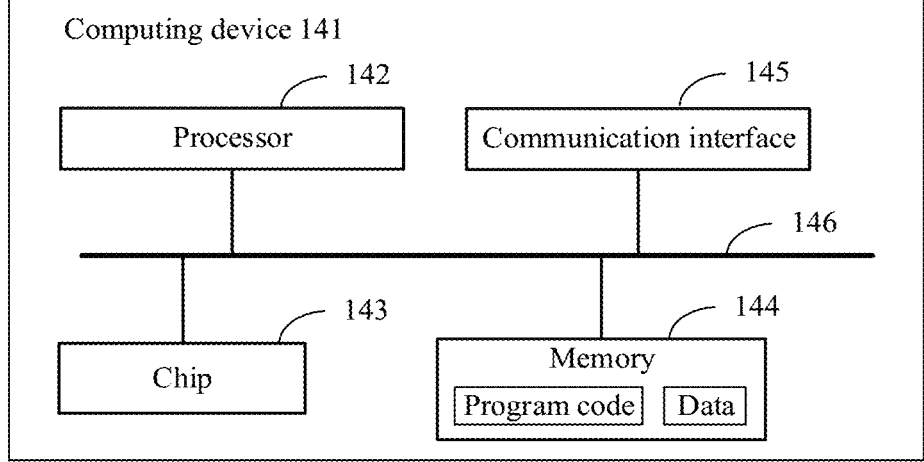

Computing device 141

142 Processor

145 Communication interface

146

143 Chip

144 Memory
Program code     Data

FIG. 14

MATRIX COMPUTING METHOD, CHIP, AND RELATED DEVICE

CROSS-REFERENCE TO RELATED APPLICATIONS

This application is a continuation of International Application No. PCT/CN2022/137086, filed on Dec. 7, 2022, which claims priority to Chinese Patent Application No. 202111567014.8, filed on Dec. 20, 2021, and Chinese Patent Application No. 202210460849.1, filed on Apr. 28, 2022. All of the aforementioned patent applications are hereby incorporated by reference in their entireties.

TECHNICAL FIELD

This application relates to the computer field, and in particular, to a matrix computing method, a chip, and a related device.

BACKGROUND

Currently, in a field such as artificial intelligence (AI) or high-performance computing (HPC), a large quantity of matrix multiplication operations are involved, for example, in a scenario such as AI model training or AI inference. To improve a computing speed and improve computing efficiency, a matrix is usually sparsified by using a pruning technology, and then computing is performed by using a sparsified matrix, to reduce a computing amount in a computing process. For example, after AI training is completed, structured pruning is performed on a weight matrix obtained through training to complete sparsification of the weight matrix. In the case of AI inference, a weight matrix obtained through structured pruning is used for inference. However, the foregoing method supports only computing by using a pruned matrix after pruning a determined matrix, and does not support a scenario in which a sparsity degree of a matrix dynamically changes in the computing process.

SUMMARY

This application provides a matrix computing method, a chip, and a related device, to support computing of a matrix whose sparsity degree dynamically changes, reduce a computing amount in the computing, and improve computing efficiency without reducing computing precision.

According to a first aspect, this application provides a chip. The chip includes a first buffer, a second buffer, a first scheduling module, and a first processing element. The first buffer is configured to buffer a first vector, and the second buffer is configured to buffer a second vector. The first scheduling module is configured to generate a first selection signal based on a bitmap of the first vector. The first selection signal may cause the first processing element to obtain, from the first buffer, a first group of non-zero elements in the first vector, and cause the first processing element to obtain, from the second buffer, a second group of elements in the second vector. The first processing element is configured to implement an operation between the first vector and the second vector based on the first group of non-zero elements in the first vector and the second group of elements in the second vector. The bitmap of the first vector indicates a non-zero element in the first vector.

Each bit in the bitmap of the first vector corresponds to one element in the first vector, and a value of each bit indicates whether the corresponding element in the first vector is 0. For example, if a value of a bit is 0, it indicates that a value of a corresponding element in the first vector is 0. If a value of a bit is 1, it indicates that a value of a corresponding element in the first vector is not 0. The first scheduling module may determine, based on the bitmap of the first vector, elements that are non-zero elements in the first vector, so that the first processing element may obtain only the non-zero element in the first vector, then obtain an element at a corresponding position from the second vector, and perform the operation between the first vector and the second vector, to reduce a computing amount and improve computing efficiency. In addition, in a process of performing a vector dot product, a value obtained by multiplying an element whose element value is 0 in one vector by a non-zero element in another vector is 0, and a result of performing a dot product of two vectors is not affected. Therefore, only the non-zero element in the first vector is obtained to perform the operation between the first vector and the second vector, and computing precision is not reduced.

In a possible implementation, the chip further includes a first multiplexer and a second multiplexer. The first multiplexer is configured to obtain, from the first buffer, the first group of non-zero elements in the first vector based on the first selection signal, and input the first group of non-zero elements into the first processing element. The second multiplexer is configured to obtain, from the second buffer, the second group of elements in the second vector based on the first selection signal, and input the second group of elements into the first processing element.

In a possible implementation, the first multiplexer and the second multiplexer each include K multi-path multiplexers. The first buffer and the second buffer each include W rows and K columns of data units, and each data unit is configured to buffer one element in a vector or matrix. Each multi-path multiplexer in the first multiplexer is connected to a plurality of data units in the first buffer, and each data unit is connected to at least one multi-path multiplexer. A connection relationship between an $i^{th}$ multi-path multiplexer in the second multiplexer and a data unit in the second buffer is the same as a connection relationship between an $i^{th}$ multi-path multiplexer in the first multiplexer and a data unit in the first buffer.

In the operation between the first vector and the second vector, a multiplication operation needs to be performed between an $r^{th}$ element in the first vector and an $r^{th}$ element in the second vector. When elements in the first vector are stored in the first buffer and elements in the second vector are stored in the second buffer, a relative position in which the $r^{th}$ element in the first vector is stored in the first buffer is the same as a relative position in which the $r^{th}$ element in the second vector is stored in the second buffer. For example, the $r^{th}$ element in the first vector is stored in an $r^{th}$ data unit in a $1^{st}$ row in the first buffer, and the $r^{th}$ element in the second vector is stored in an $r^{th}$ data unit in a $1^{st}$ row in the second buffer. In addition, the $i^{th}$ multi-path multiplexer in the first multiplexer is connected to the plurality of data units in the first buffer. Relative positions of the plurality of data units in the first buffer are the same as relative positions, in the second buffer, of a plurality of data units in the second buffer that are connected to the $i^{th}$ multi-path multiplexer in the second multiplexer. For example, if the $i^{th}$ multi-path multiplexer in the first multiplexer is connected to a $2^{nd}$ data unit in the $1^{st}$ row and a $5^{th}$ data unit in a $2^{nd}$ row in the first buffer, the $i^{th}$ multi-path multiplexer in the second multiplexer is connected to a $2^{nd}$ data unit in the $1^{st}$ row and a $5^{th}$ data unit in a $2^{nd}$ row in the second buffer. In this way, the $i^{th}$ multi-path multiplexer in the first multiplexer and the $i^{th}$ multi-path multiplexer in the second multiplexer can read, based on a same selection signal, data in data units whose relative positions are the same in the first buffer and the second buffer, and the first multiplexer and the second multiplexer read, based on the same selection signal, exactly elements that need to be multiplied in the first vector and the second vector.

In a possible implementation, the first scheduling module is specifically configured to: determine, based on the bitmap of the first vector, that an element stored in a $k^{th}$ data unit in data units connected to a $j^{th}$ multi-path multiplexer in the first multiplexer is a non-zero element. The first scheduling module generates a selection signal of the $j^{th}$ multi-path multiplexer in the first multiplexer, and sends the selection signal of the $j^{th}$ multi-path multiplexer in the first multiplexer to the $j^{th}$ multi-path multiplexer in the first multiplexer and a $j^{th}$ multi-path multiplexer in the second multiplexer. The first selection signal includes the selection signal of the $j^{th}$ multi-path multiplexer in the first multiplexer.

The first multiplexer includes K multi-path multiplexers, and the first scheduling module generates, selection signals respectively corresponding to the K multi-path multiplexers in one periodicity. In other words, the first selection signal includes the selection signals respectively corresponding to the K multi-path multiplexers, so that multi-path multiplexers in the first multiplexer and the second multiplexer separately read, based on a received selection signal, one piece of data from a connected data unit.

A plurality of data units connected to one multi-path multiplexer above have different priorities. Before generating a selection signal of one multi-path multiplexer, the first scheduling module first determines, based on the bitmap of the first vector, whether an element in the first vector stored in a data unit with a highest priority in data units connected to the multi-path multiplexer is 0. If the element stored in the data unit with the highest priority is not 0, a selection signal corresponding to the data unit with a $1^{st}$ priority is generated; or if the element stored in the data unit with the highest priority is 0, whether an element stored in a data unit with a $2^{nd}$ priority is 0 is further determined based on the bitmap of the first vector. If the element stored in the data unit with the $2^{nd}$ priority is not 0, a selection signal corresponding to the data unit with the $2^{nd}$ priority is generated; or if the element stored in the data unit with the $2^{nd}$ priority is 0, whether an element stored in a data unit with a $3^{rd}$ priority is 0 is further determined based on the bitmap of the first vector. The rest may be deduced by analogy, until a selection signal of the multi-path multiplexer is generated. By setting priorities, elements in a plurality of data units connected to multi-path multiplexers may be read in sequence.

It should be noted that, after determining that an element stored in a data unit is not 0 and generating a selection signal corresponding to the data unit, the first scheduling module needs to set a bit position in the bitmap corresponding to the element stored in the data unit to 0, to prevent the element in the data unit from being read again to cause a computing error.

In a possible implementation, the first multiplexer is specifically configured to: obtain, based on the selection signal of the $j^{th}$ multi-path multiplexer in the first multiplexer and by using the $j^{th}$ multi-path multiplexer in the first multiplexer, a first element in the $k^{th}$ data unit in the data units connected to the $j^{th}$ multi-path multiplexer in the first multiplexer, and input the first element into the first processing element, where the first element is one of the first group of non-zero elements. The second multiplexer is specifically configured to obtain, based on the selection signal of the $j^{th}$ multi-path multiplexer in the first multiplexer and by using the $j^{th}$ multi-path multiplexer in the second multiplexer, a second element in a $k^{th}$ data unit in data units connected to the $j^{th}$ multi-path multiplexer in the second multiplexer, and input the second element into the first processing element, where the second element is one of the second group of elements.

In one periodicity, the first scheduling module sequentially generates the selection signals respectively corresponding to the K multi-path multiplexers in the first multiplexer, so that the first multiplexer and the second multiplexer separately extract K elements from connected buffers, and implement a dot product of the first vector and the second vector based on the extracted K pairs of data. It should be understood that the first multiplexer may not extract all non-zero elements from the first buffer in one periodicity. However, the first multiplexer may extract K non-zero elements at a time, and the first buffer stores W rows and K columns of elements. Therefore, after a maximum of W periodicities, all the non-zero elements in the first buffer may be extracted, to complete the operation between the first vector and the second vector.

In a possible implementation, after the first processing element completes the operation between the first vector and the second vector, the first scheduling module generates an erasing signal. The erasing signal indicates the first buffer and the second buffer to erase currently buffered data, to buffer data required for next computing.

In a possible implementation, the first vector may be a part of a vector, and the second vector may be a part of another vector; or the first vector is a row vector, and the second vector is a column in a matrix; or the first vector belongs to any row in a first matrix, and the second vector belongs to any column in a second matrix. In this case, the chip can implement an operation between vectors, an operation between a vector and a matrix, or an operation between matrices through a plurality of times of the foregoing computing process.

In a possible implementation, the chip further includes a third buffer and a second processing element. The third buffer is configured to buffer a third vector, where the third vector belongs to a column in the second matrix other than a column in which the second vector is located, and the first selection signal is further used to cause the second processing element to obtain, from the third buffer, a third group of elements in the third vector. The second processing element is configured to implement an operation between the first vector and the third vector based on the first group of non-zero elements and the third group of elements.

The third buffer and the second processing element are added, the operation between the first vector and the third vector can be completed by using the second processing element, and the operation between the first vector and the second vector can be completed by using the first processing element. The second vector and the third vector both belong to the second matrix, so that the chip can implement the operation between a vector and a matrix.

In a possible implementation, the chip further includes a third multiplexer, and the third multiplexer is configured to obtain, from the third buffer, the third group of elements in the third vector based on the first selection signal, and input the third group of elements into the second processing element.

In a possible implementation, the third multiplexer includes K multi-path multiplexers, the third buffer includes W rows and K columns of data units, and each data unit is configured to buffer one element. A connection relationship between an $i^{th}$ multi-path multiplexer in the third multiplexer and a data unit in the third buffer is the same as the connection relationship between the $i^{th}$ multi-path multiplexer in the first multiplexer and the data unit in the first buffer.

The third multiplexer is configured to obtain, from the third buffer, an element in the third vector, and input the element into the second processing element, so that the second processing element implements the operation between the first vector and the third vector. In the operation between the first vector and the third vector, a multiplication operation needs to be performed between the $r^{th}$ element in the first vector and an $r^{th}$ element in the third vector. When the elements in the first vector are stored in the first buffer and elements in the third vector are stored in the third buffer, the relative position in which the $r^{th}$ element in the first vector is stored in the first buffer is the same as a relative position in which the $r^{th}$ element in the third vector is stored in the third buffer. For example, the $r^{th}$ element in the first vector is stored in the $r^{th}$ data unit in the $1^{st}$ row in the first buffer, and the $r^{th}$ element in the third vector is stored in an $r^{th}$ data unit in a $1^{st}$ row in the third buffer. In addition, $i^{th}$ multi-path multiplexer in the first multiplexer is connected to the plurality of data units in the first buffer. Relative positions of the plurality of data units in the first buffer are the same as relative positions, in the third buffer, of a plurality of data units in the third buffer that are connected to the $i^{th}$ multi-path multiplexer in the third multiplexer. For example, if the $i^{th}$ multi-path multiplexer in the first multiplexer is connected to the $2^{nd}$ data unit in the $1^{st}$ row and the $5^{th}$ data unit in the $2^{nd}$ row in the first buffer, the $i^{th}$ multi-path multiplexer in the third multiplexer is connected to a $2^{nd}$ data unit in the $1^{st}$ row and a $5^{th}$ data unit in a $2^{nd}$ row in the third buffer. In this way, the $i^{th}$ multi-path multiplexer in the first multiplexer and the $i^{th}$ multi-path multiplexer in the third multiplexer can read, based on a same selection signal, data in data units whose relative positions are the same in the first buffer and the third buffer, and the first multiplexer and the third multiplexer read, based on the same selection signal, exactly elements that need to be multiplied in the first vector and the third vector.

In a possible implementation, the third multiplexer is specifically configured to: obtain, based on the selection signal of the $j^{th}$ multi-path multiplexer in the first multiplexer and by using a $j^{th}$ multi-path multiplexer in the third multiplexer, a third element in a $k^{th}$ data unit in data units connected to the $j^{th}$ multi-path multiplexer in the third multiplexer, and input the third element into the second processing element, where the third element is one of the third group of elements.

In a possible implementation, the chip further includes a fourth buffer, a second scheduling module, and a third processing element. The fourth buffer is configured to buffer a fourth vector, and the fourth vector belongs to a row in the first matrix other than a row in which the first vector is located.

The second scheduling module is configured to generate a second selection signal based on a bitmap of a fourth vector. The second selection signal is used to cause the third processing element to obtain, from the fourth buffer, a fourth group of non-zero elements in the fourth vector, cause the third processing element to obtain, from the second buffer, a fifth group of elements in the second vector, and the bitmap of the fourth vector indicates a non-zero element in the fourth vector.

The third processing element is configured to implement an operation between the fourth vector and the second vector based on the fourth group of non-zero elements and the fifth group of elements.

After the third buffer and the second processing element are added, the fourth buffer, the second scheduling module, and the third processing element are further added. The operation between the fourth vector in the first matrix and the second vector in the second matrix can be completed by using the third processing element, the operation between the first vector in the first matrix and the third vector in the second matrix can be completed by using the second processing element, and the operation between the first vector in the first matrix and the second vector in the second matrix can be completed by using the first processing element, so that the chip can implement the operation between matrices.

In a possible implementation, the chip further includes a fourth multiplexer and a fifth multiplexer. The fourth multiplexer is configured to obtain, from the fourth buffer, the fourth group of non-zero elements in the fourth vector based on the second selection signal, and input the fourth group of non-zero elements into the third processing element. The fifth multiplexer is configured to obtain, from the second buffer, the fifth group of elements in the second vector based on the second selection signal, and input the fifth group of elements into the third processing element.

In a possible implementation, the fourth multiplexer includes K multi-path multiplexers, and the fifth multiplexer includes K multi-path multiplexers. The fourth buffer includes W rows and K columns of data units, and each data unit is configured to buffer one element.

Each multi-path multiplexer in the fourth multiplexer is connected to a plurality of data units in the fourth buffer, and each data unit is connected to at least one multi-path multiplexer. A connection relationship between an $i^{th}$ multi-path multiplexer in the fourth multiplexer and a data unit in the fourth buffer is the same as the connection relationship between the $i^{th}$ multi-path multiplexer in the first multiplexer and the data unit in the first buffer. A connection relationship between an $i^{th}$ multi-path multiplexer in the fifth multiplexer and the data unit in the second buffer is the same as the connection relationship between the $i^{th}$ multi-path multiplexer in the first multiplexer and the data unit in the first buffer.

It should be noted that the fifth multiplexer may alternatively be connected to a fifth buffer. However, because the fifth multiplexer is configured to obtain an element in the second vector, and the second vector is buffered in the second buffer, the fifth multiplexer may share the second buffer with the second multiplexer, to reduce complexity of the chip, reduce a size of the chip, and reduce costs.

The fourth multiplexer is configured to obtain, from the fourth buffer, an element in the third vector, and input the element into the third processing element, so that the third processing element implements the operation between the fourth vector and the second vector. In the operation between the fourth vector and the second vector, a multiplication operation needs to be performed between an $r^{th}$ element in the fourth vector and the $r^{th}$ element in the second vector. When elements in the fourth vector are stored in the fourth buffer and the elements in the second vector are stored in the second buffer, a relative position in which the $r^{th}$ element in the fourth vector is stored in the fourth buffer is the same as the relative position in which the $r^{th}$ element in the second vector is stored in the second buffer. For example, the $r^{th}$ element in the second vector is stored in the $r^{th}$ data unit in the $1^{st}$ row in the second buffer, and the $r^{th}$ element in the fourth vector is stored in an $r^{th}$ data unit in a $1^{st}$ row in the fourth buffer. In addition, the $i^{th}$ multi-path multiplexer in the fourth multiplexer is connected to the plurality of data units in the fourth buffer. Relative positions of the plurality of data units in the fourth buffer are the same as relative positions, in the second buffer, of the plurality of data units in the second buffer that are connected to the $i^{th}$ multi-path multiplexer in the fifth multiplexer. In this way, the $i^{th}$ multi-path multiplexer in the fourth multiplexer and the $i^{th}$ multi-path multiplexer in the fifth multiplexer can read, based on a same selection signal, data in data units whose relative positions are the same in the fourth buffer and the second buffer, and the fourth multiplexer and the fifth multiplexer read, based on the same selection signal, exactly elements that need to be multiplied in the fourth vector and the second vector.

In a possible implementation, the second scheduling module is specifically configured to determine, based on the bitmap of the fourth vector, that an element stored in an $m^{th}$ data unit in data units connected to a $j^{th}$ multi-path multiplexer in the fourth multiplexer is a non-zero element. The second scheduling module generates a selection signal of the $j^{th}$ multi-path multiplexer, and sends the selection signal of the $j^{th}$ multi-path multiplexer to the $j^{th}$ multi-path multiplexer in the fourth multiplexer and a $j^{th}$ multi-path multiplexer in the fifth multiplexer. The second selection signal includes the selection signal of the $j^{th}$ multi-path multiplexer in the fourth multiplexer.

In a possible implementation, the fourth multiplexer is specifically configured to: obtain, based on the selection signal of the $j^{th}$ multi-path multiplexer in the fourth multiplexer and by using the $j^{th}$ multi-path multiplexer in the fourth multiplexer, a fourth element in the $m^{th}$ data unit in the data units connected to the $j^{th}$ multi-path multiplexer of the fourth multiplexer, and input the fourth element into the third processing element, where the fourth element is one of the fourth group of non-zero elements. The fifth multiplexer is specifically configured to: obtain, based on the selection signal of the $j^{th}$ multi-path multiplexer in the fourth multiplexer and by using the $j^{th}$ multi-path multiplexer in the fifth multiplexer, a fifth element in an $m^{th}$ data unit in data units connected to the $j^{th}$ multi-path multiplexer in the fifth multiplexer, and input the fifth element into the third processing element, where the fifth element is one of the fifth group of elements.

In one periodicity, the second scheduling module sequentially generates selection signals respectively corresponding to the K multi-path multiplexers in the fourth multiplexer, so that the fourth multiplexer and the fifth multiplexer separately extract K elements from connected buffers, and implement a dot product of the fourth vector and the second vector based on the extracted K pairs of data. It should be understood that the fourth multiplexer may not extract all non-zero elements from the fourth buffer in one periodicity. However, the fourth multiplexer may extract K non-zero elements at a time, and the fourth buffer stores W rows and K columns of elements. Therefore, after a maximum of W periodicities, all the non-zero elements in the fourth buffer may be extracted, to complete the operation between the fourth vector and the second vector.

According to a second aspect, this application provides a matrix computing method, applied to a chip. The chip includes a first buffer, a second buffer, a first scheduling module, and a first processing element, and the method includes: The chip buffers a first vector by using the first buffer, and buffers a second vector by using the second buffer. After the chip buffers the first vector and the second vector, the first scheduling module of the chip generates a first selection signal based on a bitmap of the first vector, where the first selection signal may cause the first processing element to obtain, from the first buffer, a first group of non-zero elements in the first vector, cause the first processing element to obtain, from the second buffer, a second group of elements in the second vector, and the bitmap of the first vector indicates a non-zero element in the first vector. Then, the chip implements an operation between the first vector and the second vector by using the first processing element and based on the first group of non-zero elements and the second group of elements.

In a possible implementation, the chip further includes a first multiplexer and a second multiplexer. The first multiplexer of the chip obtains, from the first buffer, the first group of non-zero elements in the first vector based on the first selection signal, and inputs the first group of non-zero elements into the first processing element. The second multiplexer of the chip obtains, from the second buffer, the second group of elements in the second vector based on the first selection signal, and inputs the second group of elements into the first processing element.

In a possible implementation, the first multiplexer and the second multiplexer each include K multi-path multiplexers. The first buffer and the second buffer both include W rows and K columns of data units, and each data unit is configured to buffer one element. Each multi-path multiplexer in the first multiplexer is connected to a plurality of data units in the first buffer, and each data unit is connected to at least one multi-path multiplexer. A connection relationship between an $i^{th}$ multi-path multiplexer in the second multiplexer and a data unit in the second buffer is the same as a connection relationship between an $i^{th}$ multi-path multiplexer in the first multiplexer and a data unit in the first buffer.

In a possible implementation, that the first scheduling module of the chip generates a first selection signal based on a bitmap of the first vector includes: The chip determines, based on the bitmap of the first vector, that an element stored in a $k^{th}$ data unit in data units connected to a $j^{th}$ multi-path multiplexer in the first multiplexer is a non-zero element. The first scheduling module generates a selection signal of the $j^{th}$ multi-path multiplexer, and sends the selection signal of the $j^{th}$ multi-path multiplexer to the $j^{th}$ multi-path multiplexer in the first multiplexer and a $j^{th}$ multi-path multiplexer in the second multiplexer. The first selection signal includes the selection signal of the $j^{th}$ multi-path multiplexer in the first multiplexer.

In a possible implementation, that the first multiplexer of the chip obtains, from the first buffer, the first group of non-zero elements in the first vector based on the first selection signal, and inputs the first group of non-zero elements into the first processing element; and the second multiplexer of the chip obtains, from the second buffer, the second group of elements in the second vector based on the first selection signal, and inputs the second group of elements into the first processing element includes: The first multiplexer of the chip obtains, based on the selection signal of the $j^{th}$ multi-path multiplexer in the first multiplexer by using the $j^{th}$ multi-path multiplexer in the first multiplexer, a first element in the $k^{th}$ data unit in the data units connected to the $j^{th}$ multi-path multiplexer in the first multiplexer, and inputs the first element into the first processing element. The second multiplexer of the chip obtains, based on the selection signal of the $j^{th}$ multi-path multiplexer in the first multiplexer and by using the $j^{th}$ multi-path multiplexer in the second multiplexer, a second element in a $k^{th}$ data unit in data units connected to the $j^{th}$ multi-path multiplexer in the second multiplexer, and inputs the second element into the first processing element. The first element is one of the first group of non-zero elements, and the second element is one of the second group of elements.

In a possible implementation, the first vector belongs to any row in a first matrix, and the second vector belongs to any column in a second matrix. In other words, the first vector may be a part or all of elements in any row in a matrix, and the second vector may be a part or all of elements in any column in another matrix.

In a possible implementation, the chip further includes a third buffer and a second processing element. The method further includes: The chip buffers a third vector by using the third buffer, where the third vector belongs to a column in the second matrix other than a column in which the second vector is located. The first selection signal further causes the second processing element to obtain, from the third buffer, a third group of elements in the third vector. The second processing element of the chip implements an operation between the first vector and the third vector based on the first group of non-zero elements and the third group of elements.

In a possible implementation, the chip further includes a third multiplexer. The method further includes: The third multiplexer of the chip obtains, from the third buffer, the third group of elements in the third vector based on the first selection signal, and inputs the third group of elements into the second processing element.

In a possible implementation, the third multiplexer includes K multi-path multiplexers, the third buffer includes W rows and K columns of data units, and each data unit is configured to buffer one element. A connection relationship between an $i^{th}$ multi-path multiplexer in the third multiplexer and a data unit in the third buffer is the same as the connection relationship between the $i^{th}$ multi-path multiplexer in the first multiplexer and the data unit in the first buffer.

In a possible implementation, that the third multiplexer of the chip obtains, from the third buffer, the third group of elements in the third vector based on the first selection signal, and inputs the third group of elements into the second processing element includes the following.

The third multiplexer of the chip obtains, based on the selection signal of the $j^{th}$ multi-path multiplexer in the first multiplexer and by using a $j^{th}$ multi-path multiplexer in the third multiplexer, a third element in a $k^{th}$ data unit in data units connected to the $j^{th}$ multi-path multiplexer in the third multiplexer, and inputs the third element into the second processing element, where the third element is one of the third group of elements.

In a possible implementation, the chip further includes a fourth buffer, a second scheduling module, and a third processing element. The method further includes: The chip buffers a fourth vector by using the fourth buffer, where the fourth vector belongs to a row in the first matrix other than a row in which the first vector is located. The second scheduling module of the chip generates a second selection signal based on a bitmap of the fourth vector, where the second selection signal is used to cause the third processing element to obtain, from the fourth buffer, a fourth group of non-zero elements in the fourth vector, cause the third processing element to obtain, from the second buffer, a fifth group of elements in the second vector, and the bitmap of the fourth vector indicates a non-zero element in the fourth vector. The third processing element of the chip implements an operation between the fourth vector and the second vector based on the fourth group of non-zero elements and the fifth group of elements.

In a possible implementation, the chip further includes a fourth multiplexer and a fifth multiplexer. The method further includes: The fourth multiplexer of the chip obtains, from the fourth buffer, the fourth group of non-zero elements in the fourth vector based on the second selection signal, and inputs the fourth group of non-zero elements into the third processing element. The fifth multiplexer of the chip obtains, from the second buffer, the fifth group of elements in the second vector based on the second selection signal, and inputs the fifth group of elements into the third processing element.

In a possible implementation, the fourth multiplexer and the fifth multiplexer each include K multi-path multiplexers. The fourth buffer includes W rows and K columns of data units, and each data unit is configured to buffer one element.

Each multi-path multiplexer in the fourth multiplexer is connected to a plurality of data units in the fourth buffer, and each data unit is connected to at least one multi-path multiplexer. A connection relationship between an $i^{th}$ multi-path multiplexer in the fourth multiplexer and a data unit in the fourth buffer is the same as the connection relationship between the $i^{th}$ multi-path multiplexer in the first multiplexer and the data unit in the first buffer. A connection relationship between an $i^{th}$ multi-path multiplexer in the fifth multiplexer and the data unit in a fifth buffer is the same as the connection relationship between the $i^{th}$ multi-path multiplexer in the first multiplexer and the data unit in the first buffer.

In a possible implementation, that the second scheduling module of the chip generates a second selection signal based on a bitmap of the fourth vector includes: determining, based on the bitmap of the fourth vector, that an element stored in an $m^{th}$ data unit in data units connected to a $j^{th}$ multi-path multiplexer in the fourth multiplexer is a non-zero element. The second scheduling module generates a selection signal of the $j^{th}$ multi-path multiplexer, and sends the selection signal of the $j^{th}$ multi-path multiplexer to the $j^{th}$ multi-path multiplexer in the fourth multiplexer and a $j^{th}$ multi-path multiplexer in the fifth multiplexer. The second selection signal includes the selection signal of the $j^{th}$ multi-path multiplexer in the fourth multiplexer.

In a possible implementation, that the fourth multiplexer of the chip obtains, from the fourth buffer, the fourth group of non-zero elements in the fourth vector based on the second selection signal, and inputs the fourth group of non-zero elements into the third processing element; and the fifth multiplexer of the chip obtains, from the second buffer, the fifth group of elements in the second vector based on the second selection signal, and inputs the fifth group of elements into the third processing element includes: The fourth multiplexer of the chip obtains, based on the selection signal of the $j^{th}$ multi-path multiplexer in the fourth multiplexer and by using the $j^{th}$ multi-path multiplexer in the fourth multiplexer, a fourth element in the $m^{th}$ data unit in the data units connected to the $j^{th}$ multi-path multiplexer in the fourth multiplexer, and inputs the fourth element into the third processing element. The fifth multiplexer of the chip obtains, based on the selection signal of the $j^{th}$ multi-path multiplexer in the fourth multiplexer and by using the $j^{th}$ multi-path multiplexer in the fifth multiplexer, a fifth element in an $m^{th}$ data unit in data units connected to the $j^{th}$ multi-path multiplexer in the fifth multiplexer, and inputs the fifth element into the third processing element. The fourth element is one of the fourth group of non-zero elements, and the fifth element is one of the fifth group of elements.

According to a third aspect, this application provides a matrix computing apparatus, including a first scheduling unit and a first processing unit. The first scheduling unit is configured to generate a first selection signal based on a bitmap of a first vector. The first selection signal may cause the first processing unit to obtain, from a first buffer, a first group of non-zero elements in the first vector, and cause the first processing unit to obtain, from a second buffer, a second group of elements in a second vector. The first processing unit is configured to implement an operation between the first vector and the second vector based on the first group of non-zero elements in the first vector and the second group of elements in the second vector, and the bitmap of the first vector indicates a non-zero element in the first vector.

In a possible implementation, after the first processing unit implements the operation between the first vector and the second vector based on the first group of non-zero elements and the second group of elements, the first scheduling unit generates an erasing signal, where the erasing signal indicates the first buffer and the second buffer to erase data currently buffered by the first buffer and the second buffer.

In a possible implementation, the first vector belongs to a part or all of elements in any row in a first matrix, and the second vector belongs to a part or all of elements in any column in a second matrix.

In a possible implementation, the matrix computing apparatus further includes a second processing unit, and the first selection signal may further cause the second processing unit to obtain a third group of elements in a third vector. The second processing unit is configured to implement an operation between the first vector and the third vector based on the first group of non-zero elements and the third group of elements. The third vector belongs to a column in the second matrix other than a column in which the second vector is located.

In a possible implementation, the matrix computing apparatus further includes a second scheduling unit and a third processing unit. The second scheduling unit is configured to generate a second selection signal based on a bitmap of a fourth vector, where the second selection signal is used to cause a third processing unit to obtain a fourth group of non-zero elements in the fourth vector, and cause the third processing unit to obtain a fifth group of elements in the second vector. The bitmap of the fourth vector indicates a non-zero element in the fourth vector, and the fourth vector belongs to a row in the first matrix other than a row in which the first vector is located. The third processing unit is configured to implement an operation between the fourth vector and the second vector based on the fourth group of non-zero elements and the fifth group of elements.

According to a fourth aspect, this application provides a computing device, where the computing device includes a chip and a memory. The memory is configured to store code, and the chip executes the code to implement the method in any one of the second aspect or the possible implementations of the second aspect.

According to a fifth aspect, this application provides a computer-readable storage medium, the computing device-readable storage medium stores instructions. When the instructions are run on a computing device, the computing device performs the method in any one of the second aspect or the possible implementations of the second aspect.

According to a sixth aspect, a computer program product including instructions is provided, including a computer program or instructions. When the computer program or the instructions are run on a computing device, the computing device is caused to perform the method in any one of the second aspect or the possible implementations of the second aspect.

In this application, based on the implementations provided in the foregoing aspects, the implementations may be further combined to provide more implementations.

BRIEF DESCRIPTION OF DRAWINGS

To describe technical solutions in embodiments of this application more clearly, the following briefly describes the accompanying drawings for describing embodiments. It is clear that the accompanying drawings in the following descriptions show merely some embodiments of this application, and a person of ordinary skill in the art may still derive other drawings from these accompanying drawings without creative efforts.

FIG. 12 is a schematic flowchart of a matrix computing method according to an embodiment of this application;

FIG. 13 is a diagram of a matrix computing apparatus according to an embodiment of this application; and FIG. 14 is a diagram of a structure of a computing device according to an embodiment of this application.

DESCRIPTION OF EMBODIMENTS

The following describes technical solutions in embodiments of this application with reference to accompanying drawings in embodiments of this application. It is clear that the described embodiments are merely a part of but not all of embodiments of this application. All other embodiments obtained by a person of ordinary skill in the art based on embodiments of this application without creative efforts shall fall within the protection scope of this application.

Currently, in a scenario related to a matrix multiplication operation, to improve computing efficiency, a pruning technology is usually used to perform sparsification processing on a matrix, so as to reduce a computing amount and improve the computing efficiency. For example, after AI training is completed, structured pruning is performed on a weight matrix obtained through training to complete sparsification of the weight matrix. A weight matrix obtained through structured pruning is used for inference during AI inference. However, the foregoing method is applicable only to performing, after a matrix participating in computing is determined, a pruning operation on the matrix, for example, to an AI inference scenario, but is not applicable to another scenario in which a sparsity degree of a matrix dynamically changes. For example, during the AI training, a weight matrix, a gradient matrix, an activation matrix, or the like dynamically changes, and a sparsity degree of a matrix also dynamically changes. If matrix sparsification needs to be implemented in an AI training process, large time costs are required, and an acceleration effect brought after the matrix sparsification is implemented through pruning is offset. Therefore, how to accelerate matrix computing when the sparsity degree of the matrix dynamically changes is an urgent technical problem to be resolved.

Figure 1:
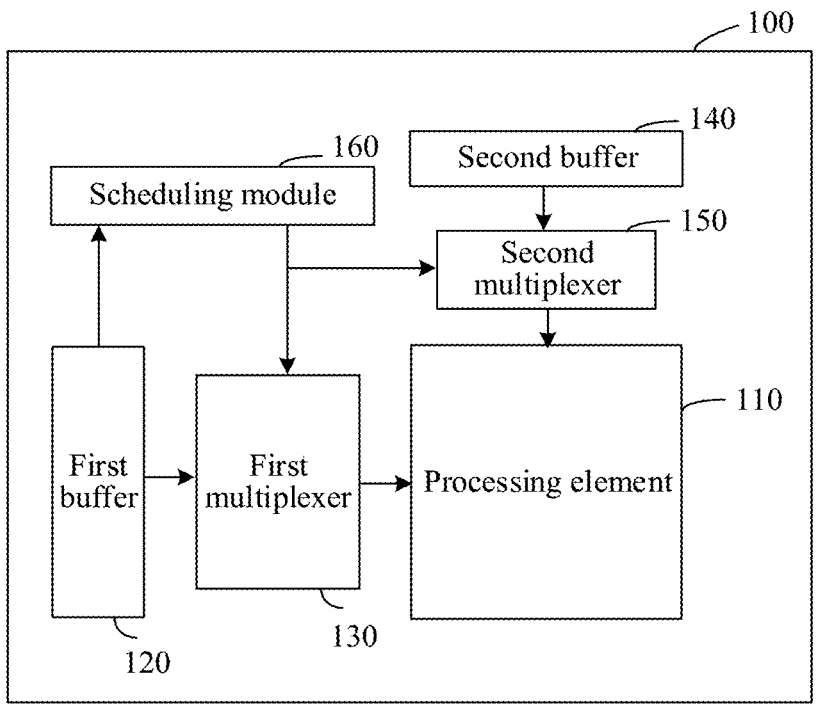
FIG. 1 is a diagram of a structure of a chip according to an embodiment of this application.

This application provides a chip, to implement an operation on a matrix whose sparsity degree dynamically changes. FIG. 1 is a diagram of a structure of a chip according to an embodiment of this application. A chip 100 includes a processing element (PE) 110, a first buffer 120, a first multiplexer (MUX) 130, a second buffer 140, a second multiplexer 150, and a scheduling module 160. An input end of the first multiplexer 130 is connected to the first buffer 120, and an output end of the first multiplexer 130 is connected to the processing element 110. An input end of the second multiplexer 150 is connected to the second buffer 140, and an output end of the second multiplexer 150 is connected to the processing element 110. Control ends of the first multiplexer 130 and the second multiplexer 150 are separately connected to the scheduling module 160.

When an operation between a first vector and a second vector needs to be performed, the first buffer 120 is configured to buffer all or a part of elements in the first vector, and the second buffer 140 is configured to buffer all or a part of elements in the second vector. The scheduling module 160 is configured to generate a selection signal based on data in the first buffer 120, and send the selection signal to the first multiplexer 130 and the second multiplexer 150. The selection signal is used to cause the first multiplexer 130 to obtain a group of non-zero elements from the connected first buffer 120, and cause the second multiplexer to obtain a group of elements from the connected second buffer 140. The first multiplexer 130 and the second multiplexer 150 input a group of data respectively obtained from corresponding buffers into the processing element 110, to cause the processing element 110 to perform the operation between the first vector and the second vector.

Figure 2:
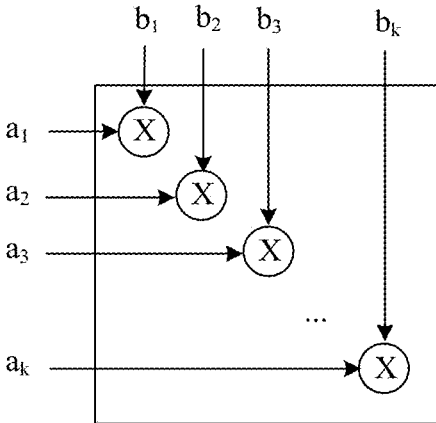
FIG. 2 is a diagram of a processing element according to an embodiment of this application.

The following separately describes, with reference to the accompanying drawings in detail, each part included in the chip 100. FIG. 2 is a diagram of a processing element according to an embodiment of this application. The processing element 110 is a dot product processing module with a length of K, and includes K multiply accumulate (MAC) units and K−1 adders (or adder trees). One processing element 110 can obtain K elements from the first buffer 120 in one periodicity, and can obtain K elements from the second buffer 140. In other words, one processing element 110 can obtain K pairs of values in one periodicity, and perform K times of multiplication and K−1 times of addition operations to implement an operation of $a_1b_1+a_2b_2+\ldots+a_Kb_K$. $a_1, a_2, a_3, \ldots, a_K$ is an element in the first vector, and $b_1, b_2, b_3, \ldots, b_K$ is an element in the second vector.

Figures 3, 4:
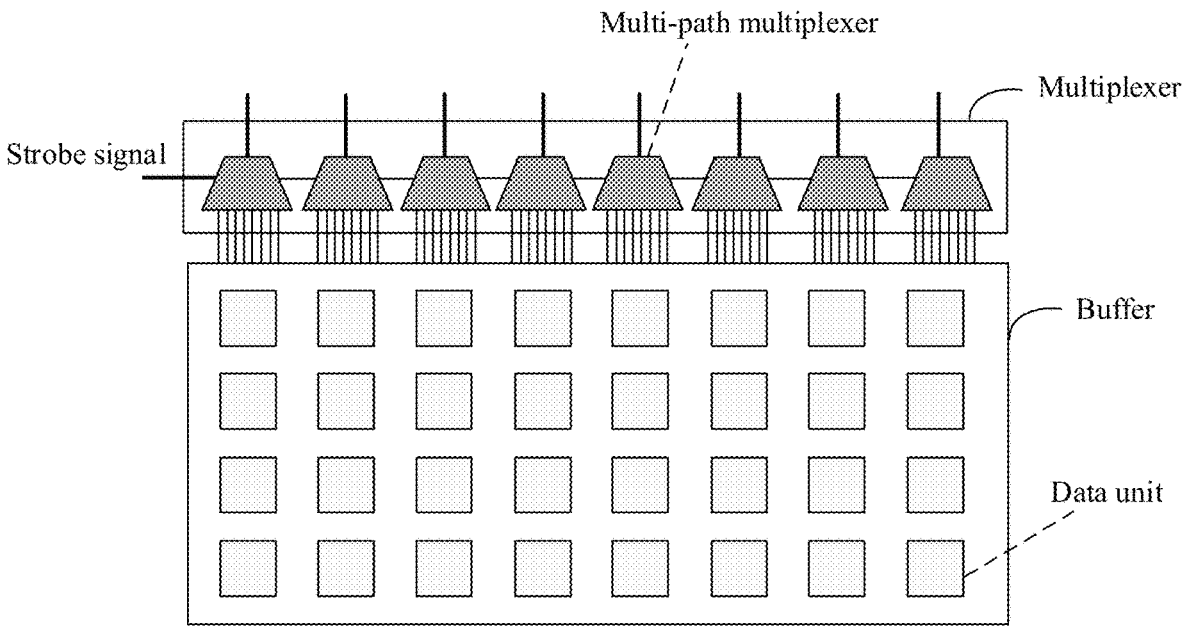
FIG. 3 is a diagram of a buffer and a multiplexer according to an embodiment of this application.
FIG. 4 is a diagram in which a multi-path multiplexer is connected to a buffer according to an embodiment of this application.

FIG. 3 is a diagram of a buffer and a multiplexer according to an embodiment of this application. Each buffer includes W rows and K columns of data units, and each data unit is configured to buffer a value of one element. In FIG.

3, that W is equal to 4 and K is equal to 8 is used as an example. Each buffer corresponds to K read ports, each read port is implemented as a multi-path multiplexer, and a multiplexer corresponding to one buffer includes K multi-path multiplexers. In other words, the first multiplexer 130 and the second multiplexer 150 in FIG. 1 separately include K multi-path multiplexers. Each multi-path multiplexer is connected to a plurality of data units in the buffer, and each data unit is connected to at least one multi-path multiplexer. Each multi-path multiplexer may be configured to read data buffered in the plurality of data units connected to the multi-path multiplexer. Each multi-path multiplexer can read data in only one data unit from the plurality of connected data units each time based on the selection signal of the scheduling module 160.

FIG. 4 is a diagram in which a multi-path multiplexer is connected to the buffer according to an embodiment of this application. One multiplexer includes a plurality of multi-path multiplexers, each multi-path multiplexer is separately connected to the plurality of data units in the buffer, and the plurality of data units connected to one multi-path multiplexer have different priorities. In this embodiment of this application, a data unit in each buffer is represented as (r, c). As shown in FIG. 4, a data unit in a $1^{st}$ row and a $3^{rd}$ column is represented as (1, 3), a data unit in a $4^{th}$ row and a $5^{th}$ column is represented as (4, 5), and the rest may be deduced by analogy. In this case, r is an integer in [1, W], and c is an integer in [1, K]. A connection relationship between the multi-path multiplexer and the buffer in FIG. 4 is used as an example. To be specific, each multi-path multiplexer is connected to eight data units of the buffer, and priorities of the eight data units connected to an $i^{th}$ multi-path multiplexer are sequentially: (1, i), (2, i), (3, i), (4, i), (2, i+1), (2, mod (i−1, 8)), (3, mod (i−2, 8)), (4, mod (i−3, 8)) in descending order. mod is a modulo operation.

Figures 5, 6:
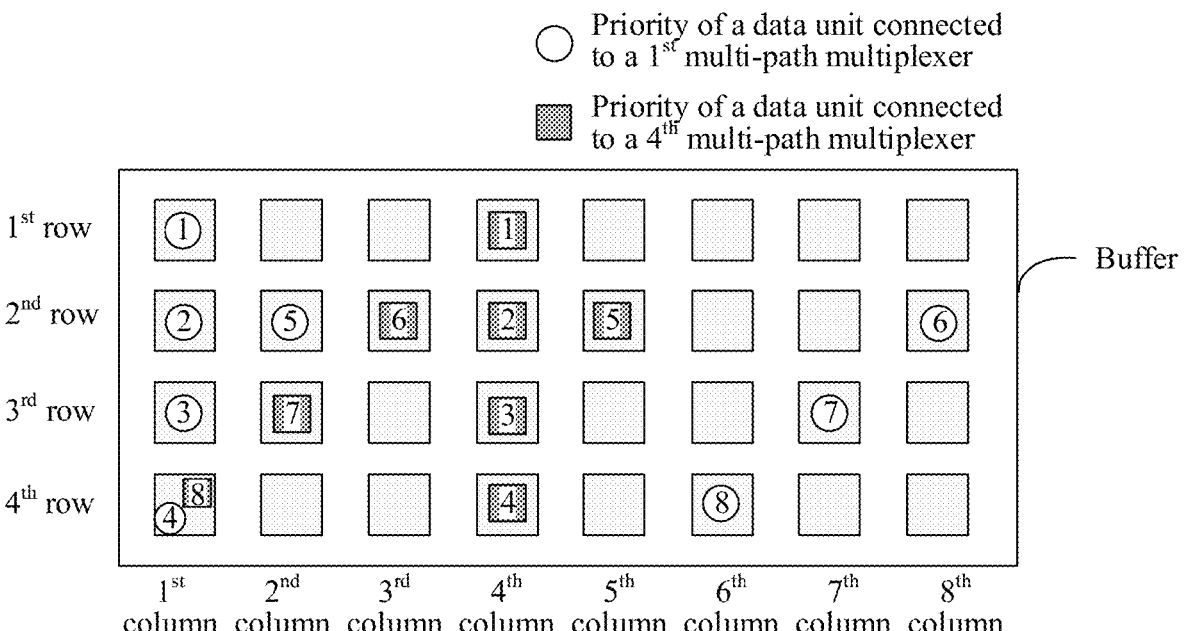
FIG. 5 is a diagram of a priority of a data unit according to an embodiment of this application.
FIG. 6 is a diagram of data in a buffer and a corresponding bitmap according to an embodiment of this application.

For example, FIG. 5 shows a priority sequence of eight data units separately connected to two multi-path multiplexers when i is equal to 1 (in other words, a $1^{st}$ multi-path multiplexer) and i is equal to 4 (in other words, a $4^{th}$ multi-path multiplexer). Digits 1 to 8 in the data units in FIG. 5 indicate priorities. A smaller digit indicates a higher priority. Priorities of eight data units connected to the $1^{st}$ multi-path multiplexer are sequentially: (1, 1), (2, 1), (3, 1), (4, 1), (2, 2), (2, 8), (3, 7), and (4, 6) in descending order. Priorities of eight data units connected to the $4^{th}$ multi-path multiplexer are sequentially: (1, 4), (2, 4), (3, 4), (4, 4), (2, 5), (2, 3), (3, 2) and (4, 1) in descending order.

It should be noted that, that each multi-path multiplexer is connected to eight data units shown in FIG. 4 is merely an example, and cannot be understood as a specific limitation. Each multi-path multiplexer may be further connected to more or fewer data units. For example, each multi-path multiplexer is connected to seven data units, or is connected to 10, 15, or 16 data units, provided that each data unit is connected to at least one multi-path multiplexer. A connection relationship between each multi-path multiplexer and the plurality of data units in FIG. 4 is merely an example, and cannot be understood as a specific limitation. The connection relationship between each multi-path multiplexer and the plurality of data units is not specifically limited in this application. However, in a same chip, each buffer needs to include W rows and K columns of data units. A buffer and a multiplexer connected to the buffer are referred to as a buffer module. In this case, connection relationships between multiplexers and data units in buffers in any two buffer modules in a same chip are the same. In other words, if one chip includes a plurality of buffer modules, a connection relationship between a multi-path multiplexer in each buffer module and a data unit in a buffer is the same. For example, a relative position, in the first buffer 120, of a plurality of data units connected to a $1^{st}$ multi-path multiplexer in the first multiplexer 130 are the same as a relative position, in the second buffer 140, of a plurality of data units connected to a $1^{st}$ multi-path multiplexer in the second multiplexer 150. For example, if an $i^{th}$ multi-path multiplexer in the first multiplexer 130 is connected to eight data units that are (1, i), (2, i), (3, i), (4, i), (2, i+1), (2, mod (i−1, 8)), (3, mod (i−2, 8)), and (4, mod (i−3, 8)) in the first buffer 120, an $i^{th}$ multi-path multiplexer in the second multiplexer is also connected to eight data units that are (1, i), (2, i), (3, i), (4, i), (2, i+1), (2, mod (i−1, 8)), (3, mod (i−2, 8)), (4, mod (i−3, 8)) in the second buffer. In this way, the $i^{th}$ multi-path multiplexer in the first multiplexer and the $i^{th}$ multi-path multiplexer in the second multiplexer can read, based on a same selection signal, data in data units whose relative positions are the same in the first buffer 120 and the second buffer 140, and the first multiplexer and the second multiplexer read, based on the same selection signal, exactly elements that are multiplied in the first vector and the second vector.

In this embodiment of this application, each multi-path multiplexer reads a non-zero element from a plurality of connected data units each time. When determining a data unit in which data is to be read by a multi-path multiplexer, the scheduling module 160 determines, based on priorities and starting from a data unit with a highest priority, whether an element in a data unit with a priority of 1 is 0. If the element in the data unit with the priority of 1 is not 0, the scheduling module 160 generates a selection signal of the data unit with the priority of 1, so that the multi-path multiplexer reads the element in the data unit with the priority of 1; or if the element in the data unit with the priority of 1 is 0, the scheduling module 160 further determines whether an element in a data unit with a priority of 2 is 0. If the element in the data unit with the priority of 2 is not 0, the scheduling module 160 generates a selection signal of the data unit with the priority of 2, so that the multi-path multiplexer reads the element in the data unit with the priority of 2; or if the element in the data unit with the priority of 2 is 0, the scheduling module 160 further determines whether an element in a data unit with a priority of 3 is 0. By analogy, the scheduling module 160 finds, in a priority sequence, a data unit whose stored element is not 0, and then generates a selection signal corresponding to the data unit, so that the multi-path multiplexer reads the element in the data unit and sends the element to the processing element 110, to cause the processing element 110 to perform a dot product operation.

One buffer is connected to K multi-path multiplexers. The scheduling module 160 needs to generate K scheduling signals $DS_j$ for the K multi-path multiplexers corresponding to one buffer in one periodicity, and each multi-path multiplexer corresponds to one selection signal. j=1, 2, . . . , 8, and j is a positive integer. In other words, in each periodicity, each multi-path multiplexer needs to read one element from the buffer based on the selection signal of the scheduling module 160 and send the element to the processing element 110. In one periodicity, the multiplexer can obtain K elements from the connected buffer by using the K multi-path multiplexers. It should be noted that, if elements in a plurality of data units connected to one multi-path multiplexer are all 0, the multi-path multiplexer sends the element 0 to the processing element 110.

In this embodiment of this application, the scheduling module 160 determines, based on a bitmap (bitmap) corresponding to data stored the buffer, whether an element in each data unit is 0. Specifically, FIG. 6 is a diagram of the data in the buffer and the corresponding bitmap. After storing data, each buffer generates a bitmap based on the data buffered in a data unit, and each bit in the bitmap corresponds to one data unit in the buffer. A value of each bit in the bitmap is 0 or 1, and indicates whether an element in a corresponding data unit is 0. For example, when a bit in the bitmap is 0, it indicates that a value of an element in a data unit corresponding to the bit is 0, and when a bit in the bitmap is 1, it indicates that a value in a data unit corresponding to the bit is not 0. Alternatively, when a bit in the bitmap is 0, it indicates that a value in a data unit corresponding to the bit is not 0; and when a bit in the bitmap is 1, it indicates that a value in a data unit corresponding to the bit is 0. In this embodiment of this application, that a bit in the bitmap is 0 indicates that a value in a data unit corresponding to the bit is 0, and a bit in the bitmap is 1 indicates that a value in a data unit corresponding to the bit is not 0 is used as an example to describe this embodiment of this application.

When the scheduling module 160 needs to generate a selection signal of a multi-path multiplexer, the scheduling module 160 first determines, whether a value of a bit corresponding to a data unit with a priority of 1 in data units connected to the multi-path multiplexer in the bitmap is 0. If the value of the bit corresponding to the data unit with the priority of 1 in the bitmap is 1, it indicates that an element in the data unit with the priority of 1 is not 0. The scheduling module 160 generates a selection signal corresponding to the data unit with the priority of 1, and sends the selection signal to the multi-path multiplexer. If the value of the bit corresponding to the data unit with the priority of 1 in the bitmap is 0, it indicates that an element in the data unit with the priority of 1 is 0. The scheduling module 160 further determines whether a value of a bit corresponding to a data unit with a priority of 2 in the data units connected to the multi-path multiplexer in the bitmap is 0. If the value of the bit corresponding to the data unit with the priority of 2 in the bitmap is 1, it indicates that an element in the data unit with the priority of 2 is not 0. The scheduling module generates a selection signal corresponding to the data unit with the priority of 2, and sends the selection signal to the multi-path multiplexer. If the value of the bit corresponding to the data unit with the priority of 2 in the bitmap is 0, it indicates that the element in the data unit with the priority of 2 is 0. The scheduling module 160 further determines whether a value of a bit corresponding to a data unit with a priority of 3 in the data units connected to the multi-path multiplexer in the bitmap is 0. By analogy, details are not described herein again.

It should be noted that, after the scheduling module 160 controls a multi-path multiplexer to obtain a non-zero element from a data unit, the scheduling module 160 needs to set a corresponding position of the element stored in the data unit in the bitmap to 0, to prevent the element in the data unit from being repeatedly read, and avoid a computing error caused because a non-zero element in a data unit with a priority lower than the data unit is not read and does not participate in an operation.

FIG. 2 to FIG. 6 describe working principles of parts included in the chip 100 shown in FIG. 1. The following describes, with reference to the accompanying drawings, methods for implementing an operation between vectors, an operation between a vector and a matrix, and an operation between matrices by using the chip 100.

Figure 7:
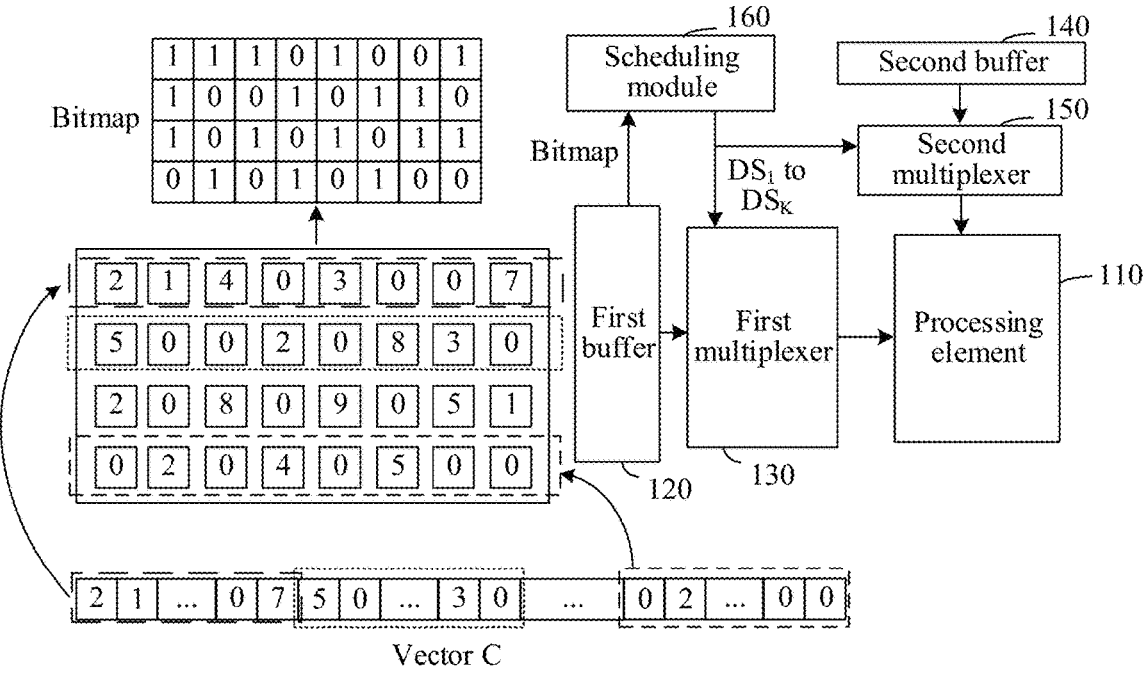
FIG. 7 is a diagram of implementing an operation between vectors according to an embodiment of this application.

FIG. 7 is a diagram of implementing an operation between vectors according to an embodiment of this application. That the chip 100 in FIG. 1 implements a dot product operation between a vector C and a vector D is used as an example. The first buffer 120 and the second buffer 140 in the chip 100 both include W rows and K columns of data units, and the first multiplexer 130 and the second multiplexer 150 both include K multi-path multiplexers. The vector C is a 1*WK vector, and the vector D is a WK*1 vector. In other words, the vector C includes one row and W*K columns of elements, and the vector D includes W*K rows and one column of elements.

When the dot product operation is performed by using the chip 100, the chip 100 loads an element included in the vector C into a data unit in the first buffer 120, and loads an element included in the vector D into a data unit in the second buffer 140. When data in the vector C is loaded into the first buffer 120 and data in the vector D is loaded into the second buffer 140, data in a $1^{st}$ column to a $K^{th}$ column in the vector C is sequentially stored in K data units in a $1^{st}$ row in the first buffer 120, and data in a $1^{st}$ row to a $K^{th}$ row in the vector D is sequentially stored in K data units in a $1^{st}$ row in the second buffer 140. Data in a $(K+1)^{th}$ column to a $2K^{th}$ column in the vector C is sequentially stored in K data units in a $2^{nd}$ row in the first buffer 120, and data in a $(K+1)^{th}$ row to a $2K^{th}$ row in the vector D is sequentially stored in K data units in a $2^{nd}$ row in the second buffer 140. The rest may be deduced by analogy until data in a $(W-1)K^{th}$ column to a $WK^{th}$ column in the vector C is sequentially stored in K data units in a $W^{th}$ row in the first buffer 120, and data in a $(W-1)K^{th}$ row to a $WK^{th}$ row in the vector D is sequentially stored in K data units in a $W^{th}$ row in the second buffer 140.

After W*K pieces of data in the vector C are stored in the first buffer 120, the first buffer 120 generates a corresponding bitmap based on a value of an element stored in each data unit. If a value of an element in a data unit is not 0, a corresponding bit of the data unit in the bitmap is set to 1; or if a value of an element in a data unit is 0, a corresponding bit of the data unit in the bitmap is set to 0. As shown in FIG. 6, the bitmap shown in FIG. 6 is a bitmap corresponding to the data buffered by the first buffer 120. In FIG. 6, that W is equal to 4 and K is equal to 8 is used as an example. A connection relationship between each multi-path multiplexer in the first multiplexer 130 and a data unit in the first buffer 120 is shown in FIG. 4. It should be understood that a corresponding bitmap based on a value in each data unit may alternatively be generated by the second buffer 140. This is not specifically limited in this embodiment of this application.

After generating the bitmap, the first buffer 120 sends the bitmap to the scheduling module 160. After receiving the bitmap, the scheduling module 160 needs to first generate a selection signal $DS_1$ of the $1^{st}$ multi-path multiplexer in the first multiplexer 130. Specifically, the scheduling module 160 first determines, based on priorities of a plurality of data units connected to the $1^{st}$ multi-path multiplexer in the first multiplexer 130, whether a value of a bit corresponding to a data unit with a priority of 1 in the data units connected to the $1^{st}$ multi-path multiplexer in the first multiplexer 130 in the bitmap is 0. If the value of the bit corresponding to the data unit with the priority of 1 in the bitmap is not 0, the scheduling module 160 generates a selection signal 000, and sends the selection signal 000 to the $1^{st}$ multi-path multiplexer in the first multiplexer 130 and the $1^{st}$ multi-path multiplexer in the second multiplexer 150. The selection signal 000 is used to cause the $1^{st}$ multi-path multiplexer in the first multiplexer 130 to read an element in the data unit with the priority of 1 and send the element to the processing element 110, and cause the $1^{st}$ multi-path multiplexer in the second multiplexer 150 to read the element in the data unit with the priority of 1 and send the element to the processing element 110.

If the scheduling module 160 determines that the value of the bit corresponding to the data unit with the priority of 1 in the data units connected to the $1^{st}$ multi-path multiplexer in the first multiplexer 130 in the bitmap is 0, the scheduling module 160 further determines whether a value of a bit corresponding to a data unit with a priority of 2 in the data units connected to the $1^{st}$ multi-path multiplexer in the first multiplexer 130 in the bitmap is 0. If the value of the bit corresponding to the data unit with the priority of 2 in the bitmap is not 0, the scheduling module 160 generates a selection signal 001, and sends the selection signal 001 to the $1^{st}$ multi-path multiplexer in the first multiplexer 130 and the $1^{st}$ multi-path multiplexer in the second multiplexer 150. The selection signal 001 is used to cause the $1^{st}$ multi-path multiplexer in the first multiplexer 130 to read an element in the data unit with the priority of 2 and send the element to the processing element 110, and cause the $1^{st}$ multi-path multiplexer in the second multiplexer 150 to read the element in the data unit with the priority of 2 and send the element to the processing element 110.

If the scheduling module 160 determines that the value of the bit corresponding to the data unit with the priority of 2 in the data units connected to the $1^{st}$ multi-path multiplexer in the first multiplexer 130 in the bitmap is 0, the scheduling module 160 further determines whether a value of a bit corresponding to a data unit with a priority of 3 in the data units connected to the $1^{st}$ multi-path multiplexer in the first multiplexer 130 in the bitmap is 0. The rest may be deduced by analogy until the $1^{st}$ multi-path multiplexer in the first multiplexer 130 reads one piece of data $c_1$ from the first buffer 120 and sends the data $c_1$ to the processing element 110, and the $1^{st}$ multi-path multiplexer in the second multiplexer 150 reads one piece of data $d_1$ from the second buffer 140 and sends the data $d_1$ to the processing element 110, to cause the processing element 110 to perform an operation of $c_1*d_1$. It should be noted that, if non-zero data is present in elements buffered by the plurality of data units connected to the $1^{st}$ multi-path multiplexer in the first multiplexer 130, a value of $c_1$ is not 0, and $d_1$ may be 0 or may not be 0. If all data buffered by the plurality of data units connected to the $1^{st}$ multi-path multiplexer in the first multiplexer 130 is 0, the value of $c_1$ is 0, and $d_1$ may be 0 or may not be 0.

For a $2^{nd}$ to a $K^{th}$ multi-path multiplexers in the first multiplexer 130, the scheduling module 160 sequentially generates corresponding selection signals $DS_2$ to $DS_K$ through a same method, so that each multi-path multiplexer in the first multiplexer 130 and the second multiplexer 150 outputs one piece of data to the processing element 110. In a $1^{st}$ periodicity, each multi-path multiplexer in the first multiplexer 130 and the second multiplexer 150 outputs one piece of data to the processing element 110, so that the processing element 110 completes K times of product operations and K−1 times of addition operations. The K times of product operations and the K−1 times of addition operations are: $e_1 = c_1d_1 + c_2d_2 + \ldots + c_td_t + \ldots + c_Kd_K$, where $c_t$ represents data output by a $t^{th}$ multi-path multiplexer in the first multiplexer 130, $d_t$ represents data output by a $t^{th}$ multi-path multiplexer in the second multiplexer 150, and t is a positive integer greater than 0 and less than or equal to K.

It should be noted that, after the scheduling module 160 generates a selection signal and sends the selection signal to the first multiplexer 130, and the first multiplexer 130 reads one piece of data from a data unit, the scheduling module 160 sets a corresponding position of the data unit in the bitmap to 0.

In a $2^{nd}$ periodicity and each subsequent periodicity, the scheduling module 160 continues to perform operations performed in the first periodicity, so that each multi-path multiplexer in the first multiplexer 130 and the second multiplexer 150 outputs one piece of data to the processing element 110, and the processing element 110 completes K times of product operations and K–1 times of addition operations, until values of all bits in the bitmap are all 0. Finally, values obtained after the processing element 110 completes K times of product operations and K–1 times of addition operations in each periodicity are added, and a dot product of the vector C and the vector D is obtained.

Because one buffer includes W*K data units and a multiplexer may read data in K data units to participate in computing in one periodicity, the dot product operation between the vector C and the vector D can be completed after a maximum of W periodicities. If the vector C has a specific sparsity degree, in other words, if some elements whose values are 0 are present in the vector C, even if the sparsity degree of the vector C that is input to the buffer each time changes, an element whose value is 0 in the vector C can be excluded from computing by using the chip provided above, to reduce a computing amount, and improve computing efficiency without reducing computing precision.

It should be noted that, after the scheduling module 160 determines that all values in the bitmap are 0, the scheduling module 160 generates an erasing signal, and sends the erasing signal to the first buffer 120 and the second buffer 140, so that the first buffer 120 and the second buffer 140 erase currently buffered data, to help buffer a next batch of data.

It should be understood that the vector C may be a part of a vector X, and the vector D may be a part of a vector Y. For example, the vector X is a 1*Z vector, and the vector Y is a Z*1 vector, where Z is greater than W*K. Because one buffer in the chip 100 can store only W*K pieces of data each time, the vector X and the vector Y are segmented, and a maximum of W*K elements are stored in the buffer of the chip 100 for computing each time. The vector C may be a row vector with one row and W*K columns, the vector D may be any column in a matrix with W*K rows and T columns, and an operation result of the vector C and the matrix is a vector with one row and T columns. In a process of performing an operation between the vector C and the matrix, one column in the matrix is buffered in the second buffer 140 each time, to obtain an element in the operation result.

Figure 8:
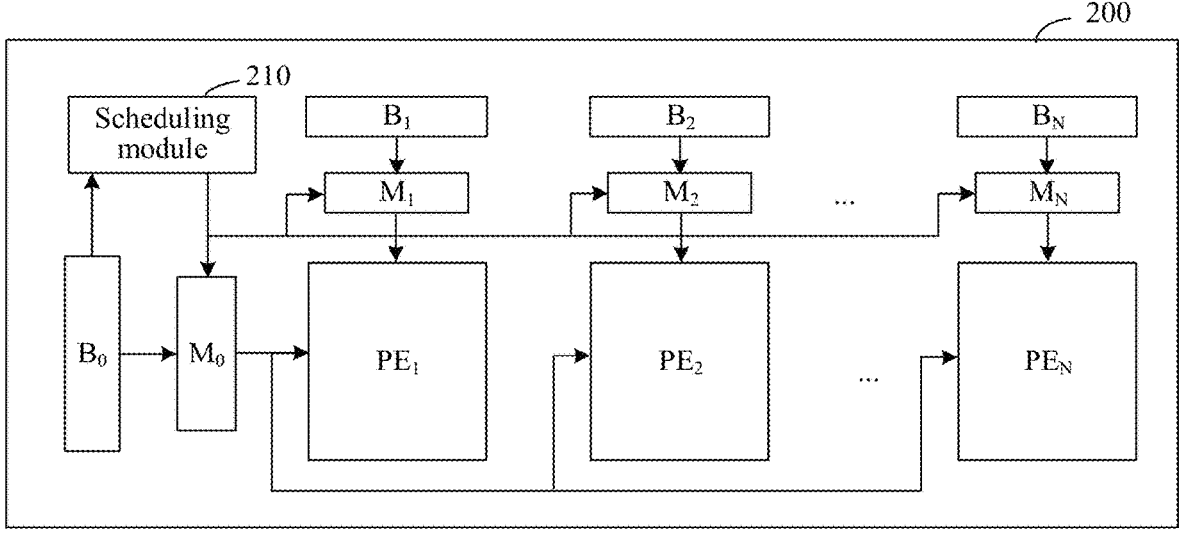
FIG. 8 is a diagram of a structure of another chip according to an embodiment of this application.

FIG. 8 is a diagram of another chip according to an embodiment of this application. A chip 200 includes N processing elements $PE_1$ to $PE_N$, N+1 buffers $B_0$ to $B_N$, N+1 multiplexers $M_0$ to MN, and a scheduling module 210. N is an integer greater than or equal to 2. The buffer $B_0$ is connected to the scheduling module 210, the scheduling module 210 is connected to each multiplexer, the N+1 buffers are in one-to-one correspondence with the N+1 multiplexers, and each multiplexer is connected to one buffer. The multiplexer $M_0$ is connected to all the N processing elements, and data read by the multiplexer $M_0$ each time is synchronously sent to the N processing elements. For a connection relationship between each multiplexer and a corresponding buffer, refer to the descriptions corresponding to FIG. 3 and FIG. 4. Details are not described herein again.

In this embodiment of this application, the chip 200 can implement a multiplication operation between a vector and a matrix. That the chip 200 shown in FIG. 8 implements a multiplication operation between a vector C and a matrix B is used as an example. Buffers in the chip 200 all include W rows and K columns of data units, and multiplexers all include K multi-path multiplexers. The vector C is a 1*WK vector, and the matrix B is a WK*N matrix. In other words, the vector C includes one row and W*K columns of elements, and the matrix B includes W*K rows and N columns of elements. It should be understood that the matrix B is equivalent to N WK*1 vectors, in other words, the matrix B is equivalent to N vectors D. The multiplication operation between the vector C and the matrix B is equivalent to performing a dot product operation between vectors between the vector C and each column in the matrix B. Therefore, the matrix B may be considered as N vectors including vectors $D_1$ to $D_N$, and each vector corresponds to a column in the matrix B.

Figure 9:
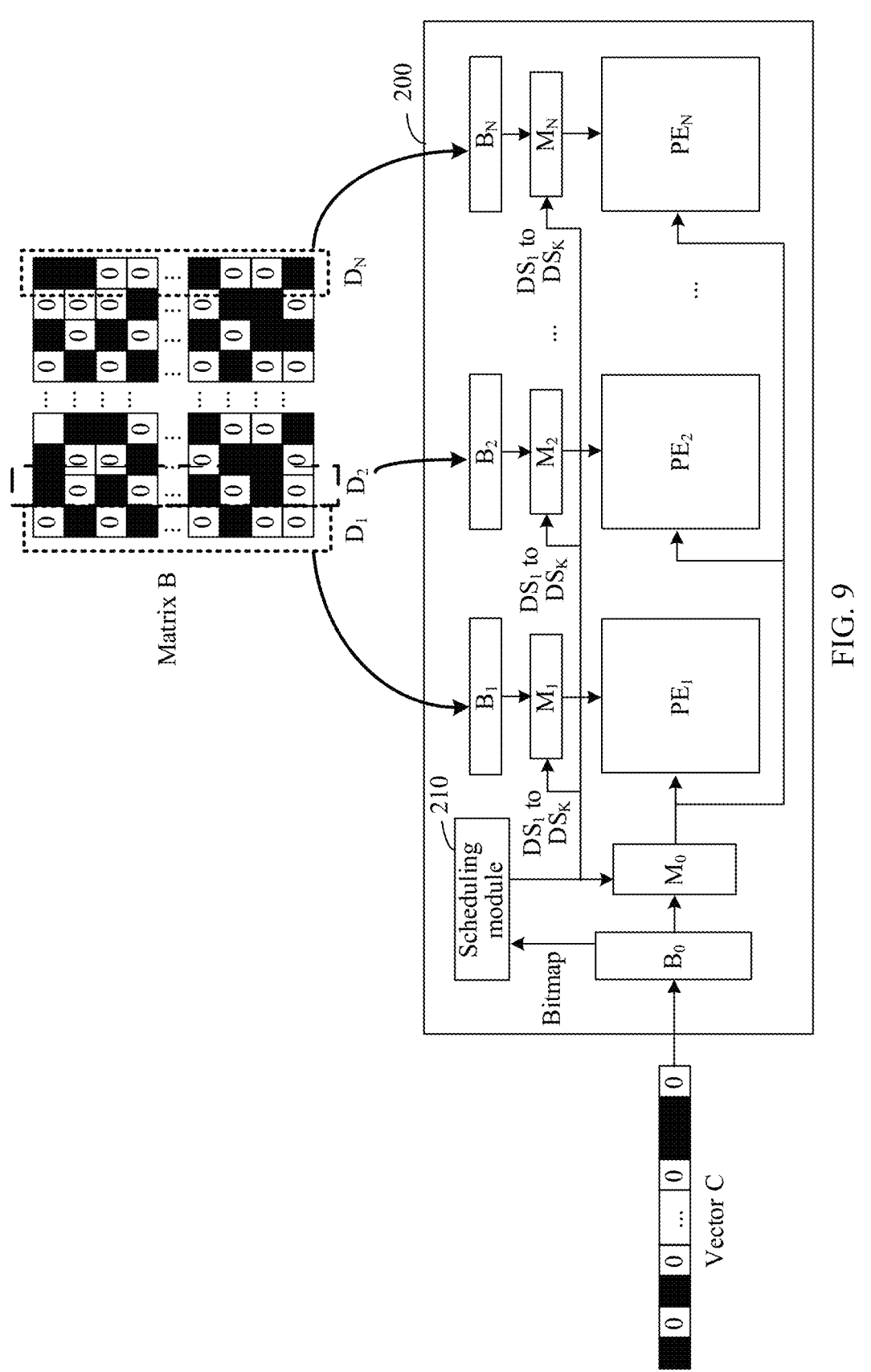
FIG. 9 is a diagram of implementing an operation between a vector and a matrix according to an embodiment of this application.

FIG. 9 is a diagram of implementing the operation between a vector and a matrix according to an embodiment of this application. Black squares in the vector C and the matrix B in FIG. 9 represent non-zero elements. When the multiplication operation between the vector C and the matrix B is performed by using the chip 200, the chip 200 loads an element included in the vector C into a data unit in the buffer $B_0$, loads an element in a vector $D_1$ corresponding to a $1^{st}$ column in the matrix B into a data unit in a buffer $B_1$, loads an element in a vector $D_2$ corresponding to a $2^{nd}$ column in the matrix B into a data unit in a buffer $B_2$, and loads an element included in a vector $D_3$ corresponding to a $3^{rd}$ column in the matrix B into a data unit in a buffer $B_3$. By analogy, an element in a vector $D_N$ corresponding to an $N^{th}$ column in the matrix B is loaded into a data unit in the buffer $B_N$. For a method for loading the vector C into the buffer $B_0$, refer to the method for loading the vector C into the first buffer 120 in the embodiment corresponding to FIG. 7. For a method for loading the vectors $D_1$ to $D_N$ into corresponding buffers, refer to the method for loading the vector D into the second buffer 140 in the embodiment corresponding to FIG. 7. Details are not described herein again.

After WK pieces of data in the vector C are stored in the buffer $B_0$, the buffer $B_0$ generates a corresponding bitmap. For a method for generating the corresponding bitmap by the buffer $B_0$, refer to the method for generating the bitmap by the first buffer 120. Details are not described herein again. After generating the bitmap, the buffer $B_0$ sends the bitmap to the scheduling module 210. After receiving the bitmap, the scheduling module 210 first generates a selection signal $DS_1$ of a $1^{st}$ multi-path multiplexer in the multiplexer $M_0$. For a method for generating the selection signal $DS_1$ by the scheduling module 210, refer to the method for generating the selection signal $DS_1$ by the scheduling module 160. Details are not described herein again.

In this embodiment of this application, after generating the selection signal $DS_1$, the scheduling module 210 sends the selection signal $DS_1$ to $1^{st}$ multi-path multiplexers in the multiplexers $M_0$ to $M_N$. The $1^{st}$ multi-path multiplexer in the multiplexer $M_0$ reads one piece of data based on the selection signal $DS_1$, and sends the data to N processing elements $PE_0$ to $PE_N$. $1^{st}$ multi-path multiplexers in multiplexers $M_1$ to $M_N$ each read one piece of data based on the selection signal $DS_1$, and send the data to processing elements connected to the multiplexers.

For a $2^{nd}$ to a $K^{th}$ multi-path multiplexers in the multi-plexers $M_0$ to $M_N$, the scheduling module 210 sequentially generates corresponding selection signals $DS_2$ to $DS_K$ through a same method, so that each multi-path multiplexer in the multiplexers $M_0$ to $M_N$ outputs one piece of data to the processing element $PE_1$ to $PE_N$. After the scheduling module 210 sequentially generates selection signals $DS_1$ to $DS_K$ in one periodicity, each processing element obtains K pairs of data, and completes K times of product operations and K−1 times of addition operations.

It should be noted that, after the scheduling module 210 generates a selection signal and sends the selection signal to the multiplexer $M_0$, and the multiplexer $M_0$ reads one piece of data from a data unit, the scheduling module 210 sets a corresponding position of the data unit in the bitmap to 0.

In a $2^{nd}$ periodicity and each subsequent periodicity, the scheduling module 210 continues to perform operations performed in the first periodicity, so that each multi-path multiplexer in the multiplexers $M_0$ to $M_N$ outputs one piece of data to the processing element $PE_1$ to $PE_N$, and the processing element $PE_1$ to $PE_N$ completes K times of product operations and K−1 times of addition operations, until values of all bits in the bitmap are all 0. For any processing element $PE_h$, values obtained after K times of product operations and K−1 times of addition operations are completed in each periodicity are added, that is, a dot product of the vector C and a vector $D_h$. h is a positive integer greater than or equal to 1 and less than or equal to N.

A multiplication operation result of the vector C and the matrix B is a 1*N vector H. A value output by the processing element $PE_h$ after the dot product operation between the vector C and the vector $D_h$ is completed is a value of an $h^{th}$ element in the vector H.

It should be understood that the vector C may be a part of a vector X, or may be a part or all of elements in a row in a matrix E. The matrix B may be a part of a matrix F. For example, the vector X is a 1*Z vector, and the matrix F is a Z*N vector, where Z is greater than W*K. Because one buffer in the chip 200 can store only W*K pieces of data each time, the vector X and the matrix F are segmented, W*K elements in the vector X are stored in the buffer $B_0$ of the chip 200 each time, and W*K elements in an $h^{th}$ column in the matrix F are stored in a buffer $B_h$ of the chip 200. In other words, W*K elements in $a_1$'t column to an $N^{th}$ column in the matrix F are distributed and stored in the buffers $B_0$ to $B_N$ of the chip 200.

Figure 10:
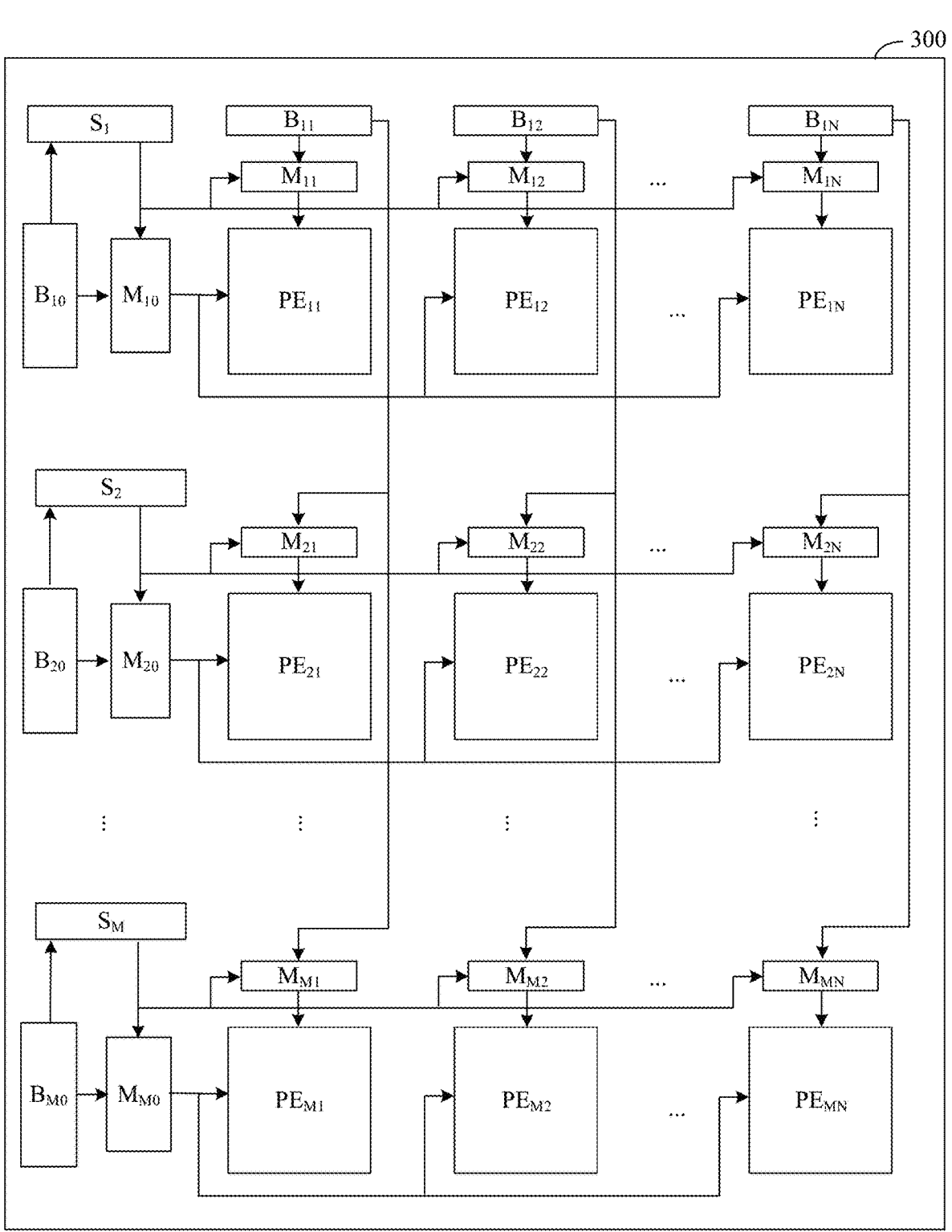
FIG. 10 is a diagram of a structure of another chip according to an embodiment of this application.

FIG. 10 is a diagram of another chip according to an embodiment of this application. A chip 300 includes M*N processing elements PEs, M+N buffers, M*(N+1) multiplexers, and M scheduling modules $S_1$ to $S_M$. A connection relationship between parts included in the chip 300 is shown in FIG. 10. The M*N processing elements are distributed in a matrix manner, the M*N processing elements are distributed in M rows, and each row includes N processing elements. Each row in a structure of the chip 300 in FIG. 10 is equivalent to a structure of the chip 200 shown in FIG. 8, and the chip 300 is equivalent to a chip including M chips 200 shown in FIG. 8.

In this embodiment of this application, the chip 300 can implement a multiplication operation between matrices. That the chip 300 shown in FIG. 10 implements a multiplication operation between a matrix A and a matrix B is used as an example. Each buffer in the chip 300 includes W rows and K columns of data units, and each multiplexer includes K multi-path multiplexers. The matrix A is an M*WK matrix, and the matrix B is a WK*N matrix. In other words, the matrix A includes M rows and W*K columns of elements, and the matrix B includes W*K rows and N columns of elements. It should be understood that the matrix A is equivalent to M 1*WK vectors, in other words, the matrix A is equivalent to M vectors C. Therefore, the multiplication operation between the matrix A and the matrix B is equivalent to performing a multiplication operation between a vector and a matrix between each row in the matrix A and the matrix B. Therefore, the matrix A may be considered as M vectors including vectors $C_1$ to $C_M$, and each vector corresponds to a row in the matrix A.

Figure 11:
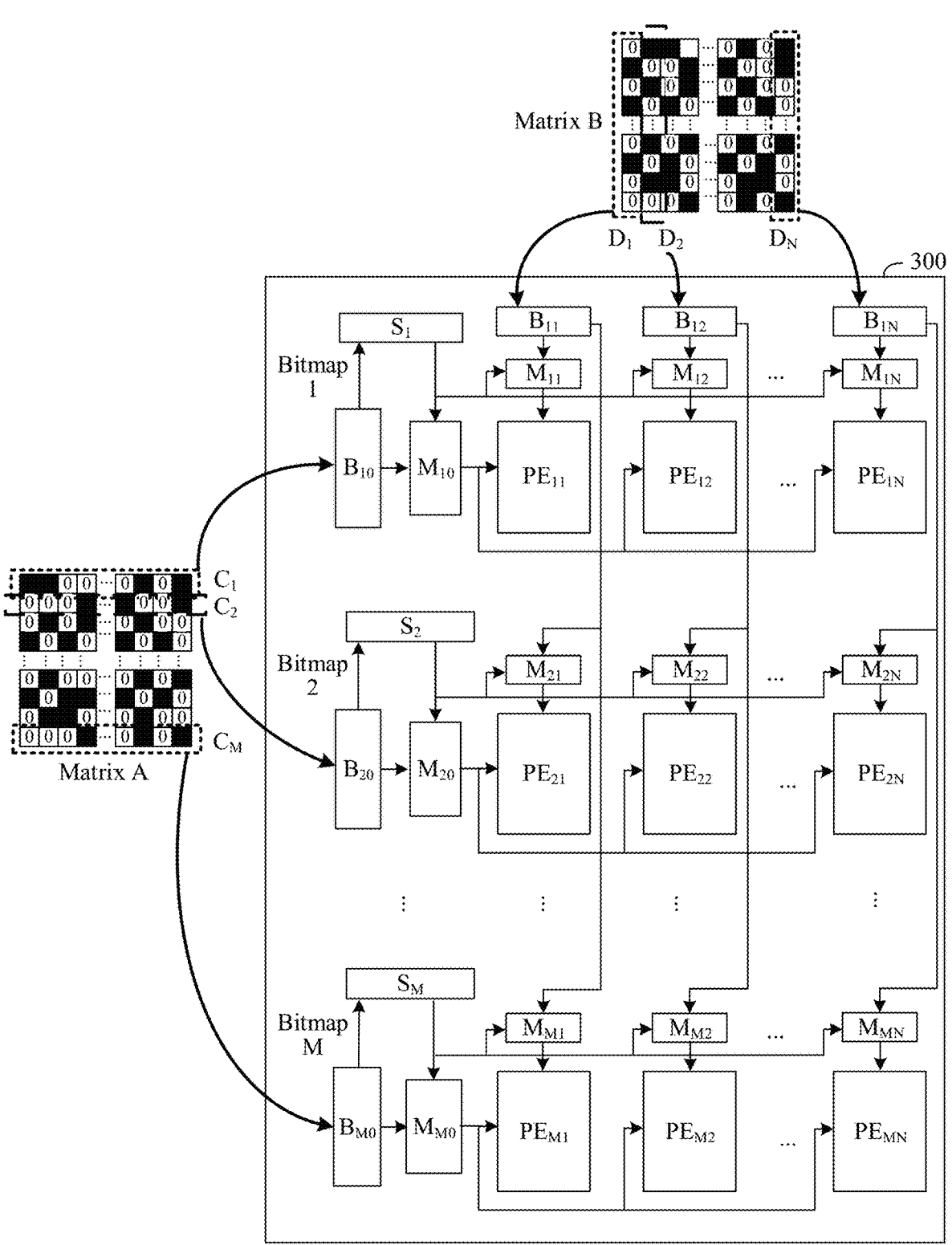
FIG. 11 is a diagram of implementing an operation between matrices according to an embodiment of this application.

The chip 200 shown in FIG. 9 can complete the multiplication operation between the vector C and the matrix B, the matrix A is equivalent to M vectors C, and the chip 300 is equivalent to a structure of M chips 200 shown in FIG. 8 or FIG. 9. Therefore, FIG. 11 is a diagram of implementing the operation between matrices according to an embodiment of this application. The chip 300 can simultaneously compute a multiplication operation between M vectors and the matrix B through a method for computing the multiplication operation between the vector C and the matrix B by the chip 200. In other words, the chip 300 can compute a multiplication operation between the matrix B and the M vectors (vectors $C_1$ to $C_M$) included in the matrix A, to obtain a multiplication operation result of the matrix A and the matrix B. The matrix A is an M*WK matrix, the matrix B is a WK*N matrix, and the multiplication operation result of the matrix A and the matrix B is an M*N matrix Q. A 1*N vector output by the N processing elements in a $g^{th}$ row in the chip 300 after a multiplication operation between a vector $C_g$ and the matrix B is completed is an element in a $g^{th}$ row in the matrix Q, where g is a positive integer greater than or equal to 1 and less than or equal to M. For a process in which a buffer, a multiplexer, a scheduling module, and a processing element included in each row in the chip 300 implement multiplication between a vector and a matrix, refer to a process in which the chip 200 shown in FIG. 9 implements the multiplication operation between the vector C and the matrix B. Details are not described herein again.

It should be noted that, after obtaining elements in the matrix A, each buffer in buffers $B_{10}, B_{20}, \ldots, B_{g0}, \ldots, B_{M0}$ in the chip 300 generates a bitmap corresponding to data buffered by each buffer, and sends the bitmap to a scheduling module connected to each buffer. For example, $B_{10}$ generates a bitmap 1 and sends the bitmap 1 to the scheduling module $S_1$, $B_{20}$ generates a bitmap 2 and sends the bitmap 2 to the scheduling module $S_2$, $B_{g0}$ generates a bitmap 1 and sends the bitmap 1 to the scheduling module $S_g$, and the like.

It should be understood that the matrix A may be a part of a matrix G, and the matrix B may be a part of a matrix F. For example, the matrix A is an M*Z vector, and the matrix F is a Z*N vector, where Z is greater than W*K. Because one buffer in the chip 300 can store only W*K pieces of data each time, the matrix G and the matrix F are segmented, W*K elements in a $g^{th}$ row in the matrix G are stored in the buffer $B_{g0}$ of the chip 300 each time, and W*K elements in an $h^{th}$ column in the matrix F are stored in a buffer $B_1h$ of the chip 200.

By using the foregoing chip 300, in a process of performing the multiplication operation between matrices, an element whose element value is 0 in the matrix may not participate in computing, to reduce a computing amount, improve computing efficiency without reducing computing precision.

With reference to FIG. 1 to FIG. 11, the following describes a matrix computing method provided in an embodiment of this application. The method is applied to a chip that can implement matrix computing, for example, the chip 100 shown in FIG. 1. For a related structure of the chip 100, refer to related descriptions in FIG. 1 to FIG. 5. Details are not described herein again. FIG. 12 is a schematic flowchart of a matrix computing method according to an embodiment of this application. The matrix computing method includes the following S121 to S123.

S121: A chip buffers a first vector and a second vector.

The chip may be the chip 100 in FIG. 1. The chip 100 buffers the first vector in a first buffer, and buffers the second vector in a second buffer. For a method for buffering the first vector in the first buffer by the chip 100, refer to the method for buffering the vector C in the first buffer 120 by the chip 100. For a method for buffering the second vector in the second buffer, refer to the method for buffering the vector D in the second buffer 140 by the chip 100. Details are not described herein again.

It should be noted that the first vector may be the vector C in the embodiment shown in FIG. 7, and the second vector may be the vector D in the embodiment shown in FIG. 7. The first vector may be a part of a vector X, and the second vector may be a part of a vector Y For example, the vector X is a 1*Z vector, and the vector Y is a Z*1 vector, where Z is greater than W*K. Because one buffer in the chip 100 can store only W*K pieces of data each time, the vector X and the vector Y are segmented, and a maximum of W*K elements are stored in the buffer of the chip 100 for computing each time. Alternatively, the first vector may be a row in a first matrix or a part of elements in a row in the first matrix, and the second vector may be a column in a second matrix or a part of elements in a column in the second matrix. For example, the vector X is a row in the first matrix, and the vector Y is a column in the second matrix.

S122: A first scheduling module of the chip generates a first selection signal based on a bitmap of the first vector.

The bitmap of the first vector indicates a non-zero element in the first vector. For the bitmap of the vector, refer to the related descriptions corresponding to FIG. 6. Details are not described herein again. The first selection signal may cause a first processing element to obtain, from the first buffer, a first group of non-zero elements in the first vector, and cause the first processing element to obtain, from the second buffer, a second group of elements in the second vector. The second group of elements obtained from the second vector may include a non-zero element, or may be all zero elements.

In this embodiment of this application, the chip 100 further includes a first multiplexer and a second multiplexer. The first processing element obtains, from the first buffer, the first group of non-zero elements in the first vector by using the first multiplexer, and obtains, from the second buffer, the second group of non-zero elements in the second vector by using the second multiplexer. The first scheduling module may be the scheduling module 160 in FIG. 7, the first multiplexer may be the first multiplexer 130 in FIG. 7, and the second multiplexer may be the second multiplexer 150 in FIG. 7. In this case, the first selection signal is the selection signals $DS_1$ to $DS_K$ in the embodiment corresponding to FIG. 7. For a process in which the first scheduling module generates the first selection signal based on the bitmap of the first vector, refer to a process in which the scheduling module 160 generates the selection signals $DS_1$ to $DS_K$ based on the bitmap of the vector C in the embodiment corresponding to FIG. 7. Details are not described herein again.

S123: The first processing element of the chip implements an operation between the first vector and the second vector based on the first group of non-zero elements and the second group of elements.

The first processing element may be the processing element 110 in FIG. 7. The first group of non-zero elements are K pieces of data that are obtained by K multi-path multiplexers in the first multiplexer from the first buffer based on a received selection signal. The second group of elements are K pieces of data that are obtained by K multi-path multiplexers in the second multiplexer from the second buffer based on a received selection signal. For a method for obtaining data in a buffer by the first multiplexer and the second multiplexer based on a received selection signal, refer to the first multiplexer 130 and the second multiplexer 150. For a method for implementing an operation between the first vector and the second vector by the first processing element based on the first group of non-zero elements and the second group of elements, refer to the method for implementing the operation between the vector C and the vector D by the processing element 110. Details are not described herein again.

In this embodiment of this application, the chip may further include a third buffer and a second processing element. The third buffer is configured to buffer a third vector. The first selection signal may further cause the second processing element to obtain, from the third buffer, a third group of elements in the third vector, and cause the second processing element to obtain, from the first buffer, the first group of non-zero elements in the first vector. The second processing element implements an operation between the first vector and the third vector based on the first group of non-zero elements in the first vector and the third group of elements in the third vector. The third vector belongs to a column in the second matrix other than a column in which the second vector is located.

In a possible implementation, the first buffer may be the buffer $B_0$ in FIG. 8, the second buffer may be the buffer $B_1$ in FIG. 8, the first multiplexer may be the multiplexer $M_0$ in FIG. 8, the second multiplexer may be the multiplexer $M_1$ in FIG. 8, and the first processing element may be the processing element $PE_1$ in FIG. 8. The third buffer may be any one or more of the buffers $B_2$ to $B_N$ in FIG. 8. In this case, the second processing element is a processing element connected to the third buffer, and the third multiplexer is a multiplexer connected to the third buffer. In other words, when the chip includes the third buffer and the second processing element, the chip may be the chip 200 shown in FIG. 8. For a method for implementing the operation between the first vector and the second vector and the operation of the first vector and the third vector by the chip 200, refer to related descriptions in embodiments corresponding to FIG. 8 and FIG. 9. Details are not described herein again.

In this embodiment of this application, in addition to the first buffer, the second buffer, the first scheduling module, the first processing element, the third buffer, and the second processing element, the chip may further include a fourth buffer, a second scheduling module, and a third processing element. The fourth buffer is configured to buffer a fourth vector, where the fourth vector belongs to a row in the first matrix other than a row in which the first vector is located. The second scheduling module generates a second selection signal based on a bitmap of the fourth vector. The second selection signal may cause the third processing element to obtain, from the fourth buffer, a fourth group of non-zero elements in the fourth vector, and cause the third processing element to obtain, from the second buffer, a fifth group of elements in the second vector. The second processing element can implement an operation between the fourth vector and the second vector based on the fourth group of non-zero elements in the fourth vector and the fifth group of elements in the second vector. The bitmap of the fourth vector indicates a non-zero element in the fourth vector.

In a possible implementation, the first buffer may be a buffer $B_{10}$ in FIG. 10, the second buffer may be a buffer $B_{11}$ in FIG. 10, the first multiplexer may be a multiplexer $M_{10}$ in FIG. 10, the second multiplexer may be a multiplexer $M_{11}$ in FIG. 10, and the first processing element may be a processing element $PE_{11}$ in FIG. 10. The third buffer may be any one or more of buffers $B_{12}$ to $B_{1N}$ in FIG. 10, the second processing element is a processing element connected to the third buffer, and the third multiplexer is a multiplexer connected to the third buffer. The second scheduling module may be any one or more of the scheduling modules $S_2$ to $S_M$ in FIG. 10. In this case, the fourth buffer is a buffer connected to the second scheduling module, and the third processing element is one or more processing elements in a same row as the second scheduling module in FIG. 10. In other words, when the chip further includes the fourth buffer, the second scheduling module, and the third processing element in addition to the first buffer, the second buffer, the first scheduling module, the first processing element, the third buffer, and the second processing element, the chip may be the chip 300 shown in FIG. 10. For methods for implementing operations on the first vector and the second vector, the first vector and the third vector, and the fourth vector and the second vector by the chip 300, refer to related descriptions in embodiments corresponding to FIG. 10 and FIG. 11. Details are not described herein again.

For brief description, the foregoing method embodiments are all described as a combination of a series of actions. However, a person skilled in the art should understand that the present invention is not limited to the described action sequence. In addition, a person skilled in the art should also understand that all embodiments described in this specification are embodiments, and the related actions are not necessarily mandatory to the present invention.

Another appropriate step combination that a person skilled in the art can think of based on the content described above also falls within the protection scope of the present invention. In addition, a person skilled in the art should also understand that all embodiments described in this specification are preferred embodiments, and the related actions are not necessarily mandatory to the present invention.

The foregoing describes in detail the chips and the methods for performing matrix computing based on the chip provided in embodiments of this application with reference to FIG. 1 to FIG. 12. The following describes, with reference to FIG. 13 and FIG. 14, a matrix computing apparatus and a device provided in embodiments of this application. FIG. 13 is a diagram of a matrix computing apparatus according to an embodiment of this application. The matrix computing apparatus may be the foregoing chip 100, the chip 200, or the chip 300. A matrix computing apparatus 131 includes a first scheduling unit 132 and a first processing unit 133. The first scheduling unit 132 is configured to generate a first selection signal based on a bitmap of a first vector. The first selection signal may cause the first processing unit 133 to obtain, from a first buffer, a first group of non-zero elements in the first vector, and cause the first processing unit 133 to obtain, from a second buffer, a second group of elements in a second vector. The first processing unit 133 is configured to implement an operation between the first vector and the second vector based on the first group of non-zero elements in the first vector and the second group of elements in the second vector, and the bitmap of the first vector indicates a non-zero element in the first vector. Specifically, the matrix computing apparatus 131 may be the chip 100 shown in FIG. 7. The first scheduling unit 132 may be configured to implement a function implemented by the scheduling module 160, and the first processing unit 133 may be configured to implement a function implemented by the processing element 110. Details are not described herein again.

In a possible implementation, after the first processing unit 133 implements the operation between the first vector and the second vector based on the first group of non-zero elements and the second group of elements, the first scheduling unit 132 generates an erasing signal, where the erasing signal indicates the first buffer and the second buffer to erase currently buffered data.

In a possible implementation, the first vector belongs to a part or all of elements in any row in a first matrix, and the second vector belongs to a part or all of elements in any column in a second matrix.

In a possible implementation, the matrix computing apparatus further includes a second processing unit 134, and the first selection signal may further cause the second processing unit 134 to obtain a third group of elements in a third vector, and cause the second processing unit 134 to obtain the first group of non-zero elements in the first vector. The second processing unit 134 is configured to implement an operation between the first vector and the third vector based on the first group of non-zero elements and the third group of elements. The third vector belongs to a column in the second matrix other than a column in which the second vector is located. Specifically, when the matrix computing apparatus includes the second processing unit 134, the matrix computing apparatus 131 may be the chip 200 shown in FIG. 8 or FIG. 9. The first scheduling unit 132 may be configured to implement a function implemented by the scheduling module 210 in FIG. 9. The first processing unit 133 may be configured to implement a function implemented by the processing element $PE_1$ in FIG. 9. The second processing unit 134 is configured to implement a function implemented by a processing element other than the processing element $PE_1$ in FIG. 9. Details are not described herein again.

In a possible implementation, the matrix computing apparatus further includes a second scheduling unit 135 and a third processing unit 136. The second scheduling unit 135 generates a second selection signal based on a bitmap of a fourth vector. The second selection signal is used to cause the third processing unit 136 to obtain a fourth group of non-zero elements in the fourth vector, and cause the third processing unit 136 to obtain a fifth group of elements in the second vector. The bitmap of the fourth vector indicates a non-zero element in the fourth vector. The third processing unit 136 is configured to implement an operation between the fourth vector and the second vector based on the fourth group of non-zero elements and the fifth group of elements.

Specifically, when the matrix computing apparatus further includes the second processing unit 134, the second scheduling unit 135, and the third processing unit 136, the matrix computing apparatus 131 may be the chip 300 shown in FIG. 10 or FIG. 11. The first scheduling unit 132 may be configured to implement a function implemented by the scheduling module $S_1$ in FIG. 11, and the first processing unit 133 may be configured to implement a function implemented by the processing element $PE_{11}$ in FIG. 11. The second processing unit 134 is configured to implement a function implemented by a processing element other than the processing element $PE_{11}$ in a $1^{st}$ row in FIG. 11. The first scheduling unit 132 may be configured to implement a function implemented by a scheduling module other than the scheduling module $S_1$ in FIG. 11. Details are not described herein again.

FIG. 14 is a diagram of a computing device according to an embodiment of this application. A computing device 141 includes the foregoing chip 100, chip 200, or chip 300. The computing device 141 further includes a processor 142, a chip 143, a memory 144, and a communication interface 145. The processor 142, the memory 144, and the communication interface 145 communicate with each other via a bus 146.

The chip 143 may be any one of the chip 100, the chip 200, or the chip 300, and can assist the computing device 141 in implementing various functions implemented by the chip 100, the chip 200, or the chip 300.

The chip 143 can implement, under scheduling of the processor 142, the operations in embodiments corresponding to FIG. 7 to FIG. 12. The processor 142 may have a plurality of specific implementation forms. For example, the processor 142 may be a central processing unit (CPU), a graphics processing unit (GPU), an embedded neural-network processing unit (NPU), or a tensor processing unit (TPU), or the processor 142 may be a single-core processor or a multi-core processor. The processor 142 may be a combination of a CPU and a hardware chip. The hardware chip may be an ASIC, a programmable logic device (PLD), or a combination thereof. The PLD may be a complex programmable logic device (CPLD), a field-programmable gate array (FPGA), a generic array logic (GAL), or any combination thereof. The processor 142 may alternatively be implemented independently by using a logic device with built-in processing logic, for example, an FPGA or a digital signal processor (DSP).

The memory 144 may be a nonvolatile memory, for example, a read-only memory (ROM), a programmable read-only memory (PROM), an erasable programmable read-only memory (EPROM), an electrically erasable programmable read-only memory (EEPROM), or a flash memory. The memory 144 may alternatively be a volatile memory. The volatile memory may be a random access memory (RAM), and is used as an external cache. By way of example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

The memory 144 may be configured to store program code and data, for example, buffer the foregoing vector or matrix, so that the chip 143 invokes the program code stored in the memory 144 to perform the operation steps in embodiments corresponding to FIG. 1 to FIG. 12.

The communication interface 145 may be a wired interface (for example, an Ethernet interface), an internal interface (for example, a peripheral component interconnect express (PCIE) bus interface), a wired interface (for example, an Ethernet interface), or a wireless interface (for example, a cellular network interface or a wireless local area network interface). The communication interface 145 is configured to communicate with another computing device or module.

The bus 146 is a peripheral component interconnect express (PCIE) bus, an extended industry standard architecture (EISA) bus, a unified bus (U bus, or UB), a compute express link (CXL), a cache coherent interconnect for accelerators (CCIX) bus, or the like. The bus 146 includes an out-of-band bus, a high-speed bus, and the like. For clear description, various buses are marked as the bus 146 in the figure.

It should be noted that FIG. 14 is only a possible implementation of this embodiment of this application. During actual application, the computing device 141 may alternatively include more or fewer components. This is not limited herein.

An embodiment of this application provides a computer-readable storage medium. The computer-readable storage medium stores computer instructions. When the computer instructions are run on a computing device, the computing device is caused to perform the operations in embodiments corresponding to FIG. 1 to FIG. 12.

An embodiment of this application provides a computer program product including instructions, including a computer program or instructions. When the computer program or the instructions are run on a computer, the computing device is caused to perform the operations in embodiments corresponding to FIG. 1 to FIG. 12.

All or a part of the foregoing embodiments may be implemented by software, hardware, firmware, or any combination thereof. When software is used to implement embodiments, all or a part of the foregoing embodiments may be implemented in a form of a computer program product. The computer program product includes at least one computer instruction. When the computer program instruction is loaded or executed on a computer, procedure or functions according to embodiments of this application are all or partially generated. The computer is a general-purpose computer, a dedicated computer, a computer network, or another programmable apparatus. The computer instruction may be stored in a computer-readable storage medium, or may be transmitted from a computer-readable storage medium to another computer-readable storage medium. For example, the computer instruction is transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage node, such as a server or a data center that integrates at least one usable medium. The usable medium may be a magnetic medium (for example, a floppy disk, a hard disk drive, or a magnetic tape), an optical medium (for example, a high density digital video disc (DVD)), or a semiconductor medium.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:
1. A chip, comprising:
a first buffer, configured to buffer a first vector;
a second buffer, configured to buffer a second vector;

a first scheduler, configured to generate a first selection signal based on a bitmap of the first vector, wherein the first selection signal causes a first processor to:

obtain, from the first buffer, a first group of non-zero elements in the first vector, and obtain, from the second buffer, a second group of elements in the second vector, and the bitmap of the first vector indicates a non-zero element in the first vector;

the first processor, configured to implement an operation between the first vector and the second vector based on the first group of non-zero elements and the second group of elements;

a first multiplexer comprising K multi-path multiplexers, each multi-path multiplexer in the first multiplexer is connected to a plurality of data units in the first buffer, and each data unit is connected to at least one multi-path multiplexer, wherein K is an integer greater than 1; and a second multiplexer comprising K multi-path multiplexers, a connection relationship between an $i^{th}$ multi-path multiplexer in the second multiplexer and a data unit in the second buffer is same as a connection relationship between an $i^{th}$ multi-path multiplexer in the first multiplexer and a data unit in the first buffer.

2. The chip according to claim 1, wherein the first multiplexer is configured to:

obtain, from the first buffer, the first group of non-zero elements in the first vector based on the first selection signal, and input the first group of non-zero elements into the first processor; and the second multiplexer is configured to:

obtain, from the second buffer, the second group of elements in the second vector based on the first selection signal, and input the second group of elements into the first processor.

3. The chip according to claim 2, wherein the first buffer and the second buffer each comprises W rows and K columns of data units, and each data unit is configured to buffer one element, wherein W is an integer greater than 1.

4. The chip according to claim 3, wherein the first scheduler is configured to:

determine, based on the bitmap of the first vector, that an element stored in a $k^{th}$ data unit in data units connected to a $j^{th}$ multi-path multiplexer in the first multiplexer is a non-zero element;

generate a selection signal of the $j^{th}$ multi-path multiplexer; and send the selection signal of the $j^{th}$ multi-path multiplexer to the $j^{th}$ multi-path multiplexer in the first multiplexer and a $j^{th}$ multi-path multiplexer in the second multiplexer, wherein the first selection signal comprises the selection signal of the $j^{th}$ multi-path multiplexer in the first multiplexer.

5. The chip according to claim 4, wherein the first vector belongs to a row in a first matrix, and the second vector belongs to a column in a second matrix.

6. The chip according to claim 5, wherein the chip further comprises a third buffer and a second processor, wherein the third buffer is configured to buffer a third vector, wherein the third vector belongs to a column in the second matrix other than a column in which the second vector is located, and the first selection signal is further used to cause the second processor to obtain, from the third buffer, a third group of elements in the third vector; and the second processor is configured to implement an operation between the first vector and the third vector based on the first group of non-zero elements and the third group of elements.

7. The chip according to claim 6, wherein the chip further comprises a third multiplexer, configured to obtain, from the third buffer, the third group of elements in the third vector based on the first selection signal, and input the third group of elements into the second processor.

8. The chip according to claim 5, wherein the chip further comprises a fourth buffer, a second scheduler and a third processor, wherein the fourth buffer is configured to buffer a fourth vector, wherein the fourth vector belongs to a row in the first matrix other than a row in which the first vector is located;

the second scheduler is configured to generate a second selection signal based on a bitmap of the fourth vector, wherein the second selection signal causes the third processor to:

obtain, from the fourth buffer, a fourth group of non-zero elements in the fourth vector, and obtain, from the second buffer, a fifth group of elements in the second vector, and the bitmap of the fourth vector indicates a non-zero element in the fourth vector; and the third processor is configured to implement an operation between the fourth vector and the second vector based on the fourth group of non-zero elements and the fifth group of elements.

9. The chip according to claim 8, wherein the chip further comprises a fourth multiplexer and a fifth multiplexer, wherein the fourth multiplexer is configured to:

obtain, from the fourth buffer, the fourth group of non-zero elements in the fourth vector based on the second selection signal, and input the fourth group of non-zero elements into the third processor; and the fifth multiplexer is configured to:

obtain, from the second buffer, the fifth group of elements in the second vector based on the second selection signal, and input the fifth group of elements into the third processor.

10. The chip according to claim 1, wherein the first scheduler is further configured to generate an erasing signal after the operation between the first vector and the second vector is implemented, wherein the erasing signal indicates the first buffer and the second buffer to erase currently buffered data.

11. A method for computing matrix on a chip, wherein the method comprises:

buffering, by the chip, a first vector and a second vector, wherein the first vector is buffered in a first buffer, and the second vector is buffered in a second buffer, wherein a plurality of data units in the first buffer are connected to each of K multi-path multiplexers comprised in a first multiplexer of the chip, K is an integer greater than 1, and a connection relationship between an $i^{th}$ multi-path multiplexer in a second multiplexer of the chip comprising K multi-path multiplexers and a data unit in the second buffer is same as a connection relationship between an $i^{th}$ multi-path multiplexer in the first multiplexer and a data unit in the first buffer;

generating, by a first scheduler of the chip, a first selection signal based on a bitmap of the first vector, wherein the first selection signal causes a first processor to:

obtain, from the first buffer, a first group of non-zero elements in the first vector, and obtain, from the second buffer, a second group of elements in the second vector, and the bitmap of the first vector indicates a non-zero element in the first vector; and implementing, by the first processor of the chip, an operation between the first vector and the second vector based on the first group of non-zero elements and the second group of elements.

12. The method according to claim 11, wherein the method further comprises:

obtaining, by the first multiplexer of the chip and from the first buffer, the first group of non-zero elements in the first vector based on the first selection signal, and inputting the first group of non-zero elements into the first processor; and obtaining, by the second multiplexer of the chip and from the second buffer, the second group of elements in the second vector based on the first selection signal, and inputting the second group of elements into the first processor.

13. The method according to claim 12, wherein the first buffer and the second buffer each comprises W rows and K columns of data units, and each data unit is configured to buffer one element, wherein K is an integer greater than 1.

14. The method according to claim 13, wherein the generating, by a first scheduler of the chip, a first selection signal based on a bitmap of the first vector comprises:

determining, by the first scheduler of the chip based on the bitmap of the first vector, that an element stored in a $k^{th}$ data unit in data units connected to a $j^{th}$ multi-path multiplexer in the first multiplexer is a non-zero element;

generating a selection signal of the $j^{th}$ multi-path multiplexer; and sending the selection signal of the $j^{th}$ multi-path multiplexer to the $j^{th}$ multi-path multiplexer in the first multiplexer and a $j^{th}$ multi-path multiplexer in the second multiplexer, wherein the first selection signal comprises the selection signal of the $j^{th}$ multi-path multiplexer in the first multiplexer.

15. The method according to claim 14, wherein the first vector belongs to a row in a first matrix, and the second vector belongs to a column in a second matrix.

16. The method according to claim 15, wherein the chip further comprises a third buffer and a second processor, and the method further comprises:

buffering, by the chip, a third vector, wherein the third vector is buffered in the third buffer, the third vector belongs to a column in the second matrix other than a column in which the second vector is located, and the first selection signal is further used to cause the second processor to obtain, from the third buffer, a third group of elements in the third vector; and implementing, by the second processor of the chip, an operation between the first vector and the third vector based on the first group of non-zero elements and the third group of elements.

17. The method according to claim 16, wherein the chip further comprises a third multiplexer, and the method further comprises:

obtaining, by the third multiplexer of the chip and from the third buffer, the third group of elements in the third vector based on the first selection signal, and inputting the third group of elements into the second processor.

18. The method according to claim 15, wherein the chip further comprises a fourth buffer, a second scheduler and a third processor, and the method further comprises:

buffering, by the chip, a fourth vector, wherein the fourth vector is buffered in the fourth buffer, and the fourth vector belongs to a row in the first matrix other than a row in which the first vector is located;

generating, by the second scheduler of the chip, a second selection signal based on a bitmap of the fourth vector, wherein the second selection signal causes the third processor to obtain, from the fourth buffer, a fourth group of non-zero elements in the fourth vector, and obtain, from the second buffer, a fifth group of elements in the second vector, and the bitmap of the fourth vector indicates a non-zero element in the fourth vector; and implementing, by the third processor of the chip, an operation between the fourth vector and the second vector based on the fourth group of non-zero elements and the fifth group of elements.

19. The method according to claim 18, wherein the chip further comprises a fourth multiplexer and a fifth multiplexer, and the method further comprises:

obtaining, by the fourth multiplexer of the chip and from the fourth buffer, the fourth group of non-zero elements in the fourth vector based on the second selection signal inputting the fourth group of non-zero elements into the third processor; and obtaining, by the fifth multiplexer of the chip and from the second buffer, the fifth group of elements in the second vector based on the second selection signal, and inputting the fifth group of elements into the third processor.

20. The method according to claim 11, wherein after the implementing an operation between the first vector and the second vector based on the first group of non-zero elements and the second group of elements, the method further comprises:

generating, by the first scheduler of the chip, an erasing signal, wherein the erasing signal indicates the first buffer and the second buffer to erase currently buffered data.

* * * * *